US009654821B2

(12) United States Patent
Coburn, IV et al.

(10) Patent No.: US 9,654,821 B2
(45) Date of Patent: *May 16, 2017

(54) SYSTEMS AND METHODS FOR NETWORKED MUSIC PLAYBACK

(75) Inventors: Arthur Coburn, IV, Lexington, MA (US); Joni Hoadley, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/341,237

(22) Filed: Dec. 30, 2011

(65) Prior Publication Data

US 2013/0174204 A1    Jul. 4, 2013

(51) Int. Cl.
*H04N 7/18* (2006.01)
*H04N 21/436* (2011.01)
(Continued)

(52) U.S. Cl.
CPC ... *H04N 21/43615* (2013.01); *H04L 65/4084* (2013.01); *H04N 21/4307* (2013.01); *H04N 21/439* (2013.01); *H04N 21/4333* (2013.01); *H04N 21/47202* (2013.01); *H04N 21/4852* (2013.01); *H04N 21/6125* (2013.01); *H04N 21/64322* (2013.01); *H04N 21/6581* (2013.01);
(Continued)

(58) Field of Classification Search
CPC ......... H04N 21/43615; H04N 21/6581; H04N 21/439; H04N 21/6125; H04N 21/64322; H04N 21/6587; H04N 21/47202; H04N 21/4852; H04N 21/8113; H04N 21/4307; H04N 21/4333; H04N 21/8586; H04L 65/4084
See application file for complete search history.

(56) References Cited

U.S. PATENT DOCUMENTS

| 5,406,634 A | 4/1995 | Anderson et al. |
| 5,856,827 A | 1/1999 | Sudo |

(Continued)

FOREIGN PATENT DOCUMENTS

| CA | 2832542 A1 | 10/2012 |
| CN | 101212823 A | 7/2008 |

(Continued)

OTHER PUBLICATIONS

International Bureau, "International Preliminary Report on Patentability", issued in connection with PCT application No. PCT/US2012/071212, mailed on Jul. 10, 2014, pp. 8.

(Continued)

*Primary Examiner* — Oschta Montoya
(74) *Attorney, Agent, or Firm* — McDonnell Boehnen Hulbert & Berghoff LLP

(57) ABSTRACT

Systems, methods, apparatus, and articles of manufacture to facilitate connection to a multimedia playback network are disclosed. An example method provides content to a local playback network. The example method includes identifying multimedia content from a content provider. The example method includes passing information regarding the multimedia content to a local playback system including one or more multimedia playback devices in response to a trigger. The example method includes facilitating play of the multimedia content via a local playback network associated with the local playback system.

37 Claims, 11 Drawing Sheets

(51) Int. Cl.
*H04N 21/658* (2011.01)
*H04L 29/06* (2006.01)
*H04N 21/439* (2011.01)
*H04N 21/61* (2011.01)
*H04N 21/643* (2011.01)
*H04N 21/6587* (2011.01)
*H04N 21/472* (2011.01)
*H04N 21/485* (2011.01)
*H04N 21/81* (2011.01)
*H04N 21/43* (2011.01)
*H04N 21/433* (2011.01)
*H04N 21/858* (2011.01)

(52) U.S. Cl.
CPC ..... *H04N 21/6587* (2013.01); *H04N 21/8113* (2013.01); *H04N 21/8586* (2013.01)

(56) References Cited

U.S. PATENT DOCUMENTS

| | | | |
|---|---|---|---|
| 5,923,902 A | 7/1999 | Inagaki | |
| 6,002,862 A | 12/1999 | Takaike | |
| 6,181,316 B1 | 1/2001 | Little et al. | |
| 6,255,961 B1 | 7/2001 | Van Ryzin et al. | |
| 6,256,554 B1 | 7/2001 | DiLorenzo | |
| 6,404,811 B1 | 6/2002 | Cvetko et al. | |
| 6,522,886 B1 | 2/2003 | Youngs et al. | |
| 6,587,127 B1 | 7/2003 | Leeke et al. | |
| 6,611,537 B1 | 8/2003 | Edens et al. | |
| 6,631,410 B1 | 10/2003 | Kowalski et al. | |
| 6,728,531 B1 | 4/2004 | Lee et al. | |
| 6,732,155 B2 | 5/2004 | Meek | |
| 6,757,517 B2 | 6/2004 | Chang | |
| 6,778,869 B2 | 8/2004 | Champion | |
| 6,826,283 B1 | 11/2004 | Wheeler et al. | |
| 6,985,694 B1 | 1/2006 | De Bonet et al. | |
| 7,017,118 B1 | 3/2006 | Carroll | |
| 7,020,048 B2 | 3/2006 | McComas | |
| 7,113,833 B1 | 9/2006 | Brown et al. | |
| 7,117,451 B2 | 10/2006 | Sielken | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,178,106 B2 | 2/2007 | Lamkin et al. | |
| 7,187,947 B1 | 3/2007 | White et al. | |
| 7,236,773 B2 | 6/2007 | Thomas | |
| 7,312,785 B2 | 12/2007 | Tsuk et al. | |
| 7,358,960 B2 | 4/2008 | Mak | |
| 7,483,538 B2 | 1/2009 | McCarty et al. | |
| 7,509,181 B2 | 3/2009 | Champion | |
| 7,571,014 B1 | 8/2009 | Lambourne et al. | |
| 7,643,894 B2 | 1/2010 | Braithwaite et al. | |
| 7,657,910 B1 | 2/2010 | McAulay et al. | |
| 7,689,304 B2 | 3/2010 | Sasaki | |
| 7,725,533 B2 | 5/2010 | Szeto et al. | |
| 7,725,551 B2 | 5/2010 | Szeto et al. | |
| 7,742,740 B2 | 6/2010 | Goldberg et al. | |
| 7,797,446 B2 | 9/2010 | Heller et al. | |
| 7,805,682 B1 | 9/2010 | Lambourne | |
| 7,827,259 B2 | 11/2010 | Heller et al. | |
| 7,853,341 B2 | 12/2010 | McCarty et al. | |
| 7,958,441 B2 | 6/2011 | Heller et al. | |
| 8,014,423 B2 | 9/2011 | Thaler et al. | |
| 8,045,952 B2 | 10/2011 | Qureshey et al. | |
| 8,050,652 B2 | 11/2011 | Qureshey et al. | |
| 8,055,364 B2 | 11/2011 | Champion | |
| 8,060,407 B1 | 11/2011 | Delker et al. | |
| 8,072,905 B2 | 12/2011 | Haff et al. | |
| 8,074,253 B1 | 12/2011 | Nathan | |
| 8,099,313 B2 | 1/2012 | Messer et al. | |
| 8,103,009 B2 | 1/2012 | McCarty et al. | |
| 8,111,132 B2 | 2/2012 | Allen et al. | |
| 8,131,390 B2 | 3/2012 | Braithwaite et al. | |
| 8,140,974 B2 | 3/2012 | Hayter et al. | |
| 8,148,622 B2 | 4/2012 | Rothkopf et al. | |
| 8,156,435 B2 | 4/2012 | Wohlert | |
| 8,204,890 B1 | 6/2012 | Gogan | |
| 8,214,740 B2 | 7/2012 | Johnson | |
| 8,234,395 B2 | 7/2012 | Millington et al. | |
| 8,290,603 B1 | 10/2012 | Lambourne | |
| 8,316,154 B2 | 11/2012 | Yoneda | |
| 8,364,296 B2* | 1/2013 | Wilhelm | G11B 27/10 455/502 |
| 8,407,623 B2 | 3/2013 | Kerr et al. | |
| 8,483,853 B1 | 7/2013 | Lambourne | |
| 8,544,046 B2 | 9/2013 | Gran et al. | |
| 8,588,949 B2 | 11/2013 | Lambourne et al. | |
| 8,799,395 B2 | 8/2014 | Seidel et al. | |
| 8,818,538 B2 | 8/2014 | Sakata | |
| 8,843,586 B2 | 9/2014 | Pantos et al. | |
| 8,880,648 B1 | 11/2014 | Arora et al. | |
| 8,954,177 B2 | 2/2015 | Sanders | |
| 8,966,394 B2 | 2/2015 | Gates et al. | |
| 9,137,602 B2 | 9/2015 | Mayman et al. | |
| 2001/0042107 A1 | 11/2001 | Palm | |
| 2002/0002039 A1 | 1/2002 | Qureshey et al. | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2002/0165921 A1 | 11/2002 | Sapieyevski | |
| 2002/0178191 A1 | 11/2002 | Sielken | |
| 2002/0194309 A1 | 12/2002 | Carter et al. | |
| 2003/0023741 A1 | 1/2003 | Tomassetti et al. | |
| 2003/0079038 A1 | 4/2003 | Robbin et al. | |
| 2003/0157951 A1 | 8/2003 | Hasty | |
| 2003/0198257 A1* | 10/2003 | Sullivan et al. | 370/516 |
| 2003/0210796 A1 | 11/2003 | McCarty et al. | |
| 2004/0024478 A1 | 2/2004 | Hans et al. | |
| 2004/0025185 A1 | 2/2004 | Goci et al. | |
| 2004/0078383 A1 | 4/2004 | Mercer et al. | |
| 2004/0078812 A1 | 4/2004 | Calvert | |
| 2004/0215611 A1 | 10/2004 | Jawa et al. | |
| 2004/0261040 A1 | 12/2004 | Radcliffe et al. | |
| 2005/0028225 A1 | 2/2005 | Dawson et al. | |
| 2005/0108320 A1 | 5/2005 | Lord et al. | |
| 2005/0155072 A1 | 7/2005 | Kaczowka et al. | |
| 2005/0166157 A1 | 7/2005 | Ollis et al. | |
| 2005/0240494 A1 | 10/2005 | Cue et al. | |
| 2005/0262253 A1 | 11/2005 | Li et al. | |
| 2006/0002681 A1 | 1/2006 | Spilo et al. | |
| 2006/0041639 A1 | 2/2006 | Lamkin et al. | |
| 2006/0062094 A1 | 3/2006 | Nathan et al. | |
| 2006/0107237 A1 | 5/2006 | Kim | |
| 2006/0156236 A1 | 7/2006 | Heller et al. | |
| 2006/0168340 A1 | 7/2006 | Heller et al. | |
| 2006/0195480 A1 | 8/2006 | Spiegelman et al. | |
| 2006/0195864 A1 | 8/2006 | New et al. | |
| 2006/0218294 A1 | 9/2006 | Rosenberg | |
| 2006/0253782 A1 | 11/2006 | Stark et al. | |
| 2006/0258289 A1* | 11/2006 | Dua | G06F 17/30058 455/41.3 |
| 2006/0263048 A1 | 11/2006 | Sato et al. | |
| 2007/0038999 A1 | 2/2007 | Millington et al. | |
| 2007/0061725 A1 | 3/2007 | Isaac et al. | |
| 2007/0067808 A1 | 3/2007 | DaCosta | |
| 2007/0083897 A1 | 4/2007 | Brownell | |
| 2007/0142944 A1 | 6/2007 | Goldberg et al. | |
| 2007/0169087 A1 | 7/2007 | Fadell | |
| 2007/0266065 A1 | 11/2007 | Rosenberg | |
| 2007/0288470 A1 | 12/2007 | Kauniskangas et al. | |
| 2008/0005690 A1 | 1/2008 | Van Vugt | |
| 2008/0016465 A1 | 1/2008 | Foxenland | |
| 2008/0025535 A1 | 1/2008 | Rajapakse | |
| 2008/0059567 A1 | 3/2008 | Williams et al. | |
| 2008/0086379 A1 | 4/2008 | Dion et al. | |
| 2008/0133715 A1 | 6/2008 | Yoneda et al. | |
| 2008/0134256 A1* | 6/2008 | DaCosta | H04N 7/17318 725/62 |
| 2008/0177822 A1 | 7/2008 | Yoneda | |
| 2008/0209487 A1 | 8/2008 | Osann et al. | |
| 2008/0242222 A1 | 10/2008 | Bryce et al. | |
| 2008/0292120 A1* | 11/2008 | Wilson | H04R 5/04 381/300 |

(56) References Cited

U.S. PATENT DOCUMENTS

| | | |
|---|---|---|
| 2009/0006542 A1 | 1/2009 | Feldman et al. |
| 2009/0059512 A1 | 3/2009 | Lydon et al. |
| 2009/0097818 A1 | 4/2009 | Hirata |
| 2009/0132712 A1 | 5/2009 | P et al. |
| 2009/0171487 A1 | 7/2009 | Wilhelm |
| 2009/0172542 A1 | 7/2009 | Girish et al. |
| 2009/0197524 A1 | 8/2009 | Haff et al. |
| 2009/0222392 A1 | 9/2009 | Martin et al. |
| 2009/0228919 A1* | 9/2009 | Zott et al. ............... 725/34 |
| 2009/0248702 A1 | 10/2009 | Schwartz et al. |
| 2009/0249222 A1 | 10/2009 | Schmidt et al. |
| 2009/0259765 A1 | 10/2009 | Karlsson et al. |
| 2009/0275285 A1 | 11/2009 | Maricevic et al. |
| 2010/0005496 A1* | 1/2010 | Ellis et al. ............... 725/87 |
| 2010/0009674 A1 | 1/2010 | Sapkota et al. |
| 2010/0031366 A1 | 2/2010 | Knight et al. |
| 2010/0042235 A1 | 2/2010 | Basso et al. |
| 2010/0082725 A1 | 4/2010 | Onishi |
| 2010/0082731 A1 | 4/2010 | Haughay et al. |
| 2010/0087214 A1 | 4/2010 | Bournel et al. |
| 2010/0095332 A1 | 4/2010 | Gran et al. |
| 2010/0206815 A1 | 8/2010 | Garusi et al. |
| 2010/0211438 A1 | 8/2010 | Lutnick et al. |
| 2010/0250669 A1 | 9/2010 | Pan |
| 2010/0299402 A1 | 11/2010 | Korman et al. |
| 2010/0299639 A1 | 11/2010 | Ramsay et al. |
| 2010/0303244 A1 | 12/2010 | Kim et al. |
| 2010/0306815 A1* | 12/2010 | Emerson ............ G11B 27/034 725/134 |
| 2011/0004330 A1 | 1/2011 | Rothkopf et al. |
| 2011/0054641 A1 | 3/2011 | Hur |
| 2011/0055901 A1 | 3/2011 | Karaoguz et al. |
| 2011/0060998 A1 | 3/2011 | Schwartz et al. |
| 2011/0066943 A1 | 3/2011 | Brillon et al. |
| 2011/0131272 A1 | 6/2011 | Littlejohn et al. |
| 2011/0131518 A1 | 6/2011 | Ohashi |
| 2011/0131520 A1 | 6/2011 | Al-Shaykh et al. |
| 2011/0179455 A1 | 7/2011 | Thompson |
| 2011/0218656 A1 | 9/2011 | Bishop et al. |
| 2011/0225496 A1 | 9/2011 | Jeffe et al. |
| 2011/0252118 A1 | 10/2011 | Pantos et al. |
| 2011/0265003 A1 | 10/2011 | Schubert et al. |
| 2011/0295974 A1 | 12/2011 | Kashef et al. |
| 2012/0029672 A1 | 2/2012 | Hamilton et al. |
| 2012/0038541 A1 | 2/2012 | Song et al. |
| 2012/0040720 A1 | 2/2012 | Zhang et al. |
| 2012/0050012 A1 | 3/2012 | Alsina et al. |
| 2012/0054808 A1 | 3/2012 | Nijim |
| 2012/0057853 A1 | 3/2012 | Huber et al. |
| 2012/0089910 A1 | 4/2012 | Cassidy |
| 2012/0113964 A1 | 5/2012 | Petersen et al. |
| 2012/0117026 A1 | 5/2012 | Cassidy |
| 2012/0117193 A1 | 5/2012 | Phillips et al. |
| 2012/0117586 A1* | 5/2012 | McCoy et al. ............ 725/25 |
| 2012/0147825 A1 | 6/2012 | Hassan et al. |
| 2012/0159372 A1 | 6/2012 | Stallings et al. |
| 2012/0174204 A1 | 7/2012 | Sturm et al. |
| 2012/0185770 A1 | 7/2012 | Hwang et al. |
| 2012/0192071 A1* | 7/2012 | Millington ............ H04J 3/0664 715/716 |
| 2012/0202485 A1 | 8/2012 | Mirbaha et al. |
| 2012/0227076 A1 | 9/2012 | McCoy et al. |
| 2012/0233067 A1 | 9/2012 | Matthew et al. |
| 2012/0272062 A1 | 10/2012 | Lee et al. |
| 2012/0284423 A1 | 11/2012 | Weel |
| 2012/0304233 A1* | 11/2012 | Roberts ............ H04N 21/23113 725/82 |
| 2012/0311094 A1 | 12/2012 | Biderman et al. |
| 2012/0311618 A1 | 12/2012 | Blaxland |
| 2013/0014015 A1 | 1/2013 | Lambourne et al. |
| 2013/0024018 A1 | 1/2013 | Chang et al. |
| 2013/0028263 A1 | 1/2013 | Rajapakse |
| 2013/0047084 A1 | 2/2013 | Sanders et al. |
| 2013/0054742 A1 | 2/2013 | Tsuji et al. |
| 2013/0073584 A1 | 3/2013 | Kuper et al. |
| 2013/0086003 A1 | 4/2013 | Alsina et al. |
| 2013/0111529 A1 | 5/2013 | Yao et al. |
| 2013/0151728 A1 | 6/2013 | Currier |
| 2013/0165164 A1 | 6/2013 | Rowe |
| 2013/0167029 A1 | 6/2013 | Friesen et al. |
| 2013/0173034 A1 | 7/2013 | Reimann et al. |
| 2013/0246916 A1 | 9/2013 | Reimann et al. |
| 2013/0254207 A1 | 9/2013 | Coburn, IV et al. |
| 2013/0300546 A1 | 11/2013 | Kim et al. |
| 2013/0326041 A1 | 12/2013 | Bellet et al. |
| 2013/0346559 A1 | 12/2013 | Van Erven et al. |
| 2013/0346859 A1 | 12/2013 | Bates et al. |
| 2013/0347117 A1 | 12/2013 | Parks et al. |
| 2014/0006483 A1 | 1/2014 | Garmark et al. |
| 2014/0006947 A1 | 1/2014 | Garmark et al. |
| 2014/0052770 A1 | 2/2014 | Gran et al. |
| 2014/0075308 A1 | 3/2014 | Sanders et al. |
| 2014/0080479 A1 | 3/2014 | Vangala et al. |
| 2014/0096166 A1 | 4/2014 | Gordon et al. |
| 2014/0108929 A1 | 4/2014 | Garmark et al. |
| 2014/0115462 A1 | 4/2014 | Reznor et al. |
| 2014/0122737 A1 | 5/2014 | Silberstein et al. |
| 2014/0123005 A1 | 5/2014 | Forstall et al. |
| 2014/0140530 A1 | 5/2014 | Gomes-Casseres et al. |
| 2014/0169569 A1 | 6/2014 | Toivanen et al. |
| 2014/0195587 A1 | 7/2014 | Sukoff et al. |
| 2014/0215009 A1 | 7/2014 | Zhang |
| 2014/0229959 A1 | 8/2014 | Beckhardt et al. |
| 2014/0378056 A1 | 12/2014 | Liu |
| 2015/0026613 A1 | 1/2015 | Kwon et al. |
| 2015/0074527 A1 | 3/2015 | Sevigny et al. |
| 2015/0074528 A1 | 3/2015 | Sakalowsky et al. |
| 2015/0256954 A1 | 9/2015 | Carlsson et al. |
| 2015/0286360 A1 | 10/2015 | Wachter |

FOREIGN PATENT DOCUMENTS

| | | |
|---|---|---|
| JP | 2007060123 A | 3/2007 |
| JP | 2007512718 A | 5/2007 |
| KR | 20090017795 | 2/2009 |
| WO | 0153994 A2 | 7/2001 |
| WO | 2005013047 A2 | 2/2005 |
| WO | 2009086599 A1 | 7/2009 |
| WO | 2011049497 A1 | 4/2011 |
| WO | 2013049346 A1 | 4/2013 |
| WO | 2013101727 A1 | 7/2013 |
| WO | 2014149533 A2 | 9/2014 |

OTHER PUBLICATIONS

"Welcome. You're watching Apple TV." Apple TV 1st Generation Setup Guide, Apr. 8, 2008 <http://manuals.info.apple.com/MANUALS/0/MA403/en_US/AppleTV_SetupGuide.pdf> Retrieved Oct. 14, 2014, 40 pages.

"Welcome. You're watching Apple TV." Apple TV 2nd Generation Setup Guide, Mar. 10, 2011 <http://manuals.info.apple.com/MANUALS/1000/MA1555/en_US/Apple_TV_2nd_gen_Setup_Guide.pdf> Retrieved Oct. 16, 2014, 36 pages.

Australian Intellectual Property Office, "Patent Examination Report No. 1", issued in connection with Australian patent application No. 2012362573, issued on Jan. 16, 2015, 3 pages.

The United States Patent and Trademark Office, "Non-Final Office Action", issued in connection with U.S. Appl. No. 14/520,566, mailed on Dec. 30, 2014, 10 pages.

Sonos, Inc.,"Sonos Multi-Room Music System User Guide," Version 090401, Apr. 1, 2009, 256 pages.

Sonos, Inc., "Sonos Wireless Dock Product Guide," Version 100101, Oct. 10, 2001, 196 pages.

Advisory Action mailed on Dec. 16, 2015, issued in connection with U.S. Appl. No. 13/904,949, filed May 29, 2013, 11 pages.

Advisory Action mailed on Dec. 2, 2015, issued in connection with U.S. Appl. No. 13/904,936, filed May 29, 2013, 4 pages.

Canadian Office Action mailed on Nov. 12, 2015, issued in connection with Canadian Application No. 2,861,790, 3 pages.

Final Office Action mailed on Dec. 7, 2015, issued in connection with U.S. Appl. No. 13/864,075, filed Apr. 16, 2013, 16 pages.

(56) References Cited

OTHER PUBLICATIONS

Non-Final Office Action mailed on Nov. 18, 2015, issued in connection with U.S. Appl. No. 13/904,896, 18 pages.
Non-Final Office Action mailed on Nov. 18, 2015, issued in connection with U.S. Appl. No. 13/904,932, filed May 29, 2013, 12 pages.
Non-Final Office Action mailed on Dec. 28, 2015, issued in connection with U.S. Appl. No. 14/520,566, filed Oct. 22, 2014, 10 pages.
Pre-Interview First Office Action mailed on Dec. 22, 2015, issued in connection with U.S. Appl. No. 14/520,578, filed Oct. 22, 2014, 9 pages.
"Advisory Action mailed on Oct. 16, 2013, issued in connection with U.S. Appl. No. 13/341,237, filed Dec. 30, 2011, 3 pages".
"AudioTron Quick Start Guide, Version 1.0", Voyetra Turtle Beach, Inc., Mar. 2001, 24 pages.
"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
"Bluetooth. "Specification of the Bluetooth System: The ad hoc SCATTERNET for affordable and highly functional wireless connectivity" Core, Version 1.0 A, Jul. 26, 1999, 1068 pages".
"Bluetooth. "Specification of the Bluetooth System: Wireless connections made easy" Core, Version 1.0 B, Dec. 1, 1999, 1076 pages".
"Dell, Inc. "Dell Digital Audio Receiver: Reference Guide" Jun. 2000, 70 pages".
"Dell, Inc. "Start Here" Jun. 2000, 2 pages".
"Final Office Action mailed on Apr. 22, 2015, issued in connection with U.S. Appl. No. 13/341,237, filed Dec. 30, 2011, 11 pages."
"Final Office Action mailed on Jun. 23, 2015, issued in connection with U.S. Appl. No. 13/904,896, filed May 29, 2013, 16 pages".
"Final Office Action mailed on Aug. 25, 2015, issued in connection with U.S. Appl. No. 13/864,081, filed Apr. 16, 2013, 15 pages."
"Final Office Action mailed on Aug. 28, 2015, issued in connection with U.S. Appl. No. 13/904,936, filed May 29, 2013, 10 pages."
"Final Office Action mailed on Jul. 8, 2015, issued in connection with U.S. Appl. No. 14/520,566, filed Oct. 22, 2014, 8 pages."
"Final Office Action mailed on Apr. 14, 2014, issued in connection with U.S. Appl. No. 13/341,237, filed Dec. 30, 2011, 12 pages".
"Final Office Action mailed on Aug. 6, 2013, issued in connection with U.S. Appl. No. 13/341,237, filed Dec. 30, 2011, 14 pages".
"International Search Report for Application No. PCT/US2014/039669, mailed on Sep. 22, 2014, 3 pages".
"International Search Report for PCT/US2014/034290 mailed Aug. 21, 2014".
"International Search Report for PCT/US2014/034292 mailed on Aug. 14, 2014".
"International Search Report for PCT/US2014/034372 mailed Aug. 20, 2014".
Jo J., et al., "Synchronized One-to-many Media Streaming with Adaptive Playout Control," Proceedings of SPIE, 2002, vol. 4861, pp. 71-82.
"Jones, Stephen. "Dell Digital Audio Receiver: Digital upgrade for your analog stereo" Analog Stereo. Jun. 24, 2000 retrieved Jun. 18, 2014, 2 pages".
"Louderback, Jim. "Affordable Audio Receiver Furnishes Homes With MP3" TechTV Vault. Jun. 28, 2000 retrieved Jul. 10, 2014, 2 pages".
Motorola., "Simplefi, Wireless Digital Audio Receiver, Installation and User Guide", Dec. 31, 2001.
"Non-Final Office Action mailed on Mar. 10, 2015, issued in connection with U.S. Appl. No. 13/864,081, filed Apr. 16, 2013, 13 pages."
"Non-Final Office Action mailed on Feb. 13, 2015, issued in connection with U.S. Appl. No. 13/904,936, filed May 29, 2013, 10 pages."

"Non-Final Office Action mailed on Mar. 13, 2015, issued in connection with U.S. Appl. No. 13/904,949, filed May 29, 2013, 20 pages".
"Non-Final Office Action mailed on Aug. 19, 2015, issued in connection with U.S. Appl. No. 13/864,075, filed Apr. 16, 2013, 18 pages."
"Non-Final Office Action mailed on Mar. 2, 2015, issued in connection with U.S. Appl. No. 13/904,896, filed May 29, 2013, 15 pages".
"Non-Final Office Action mailed on Apr. 23, 2015, issued in connection with U.S. Appl. No. 13/904,944, filed May 29, 2013, 12 pages".
"Non-Final Office Action mailed on Mar. 24, 2015, issued in connection with U.S. Appl. No. 13/864,086, filed Apr. 16, 2013, 14 pages."
"Non-Final Office Action mailed on May 28, 2015, issued in connection with U.S. Appl. No. 14/628,952, filed Feb. 23, 2015, 9 pages."
"Non-Final Office Action mailed on Oct. 8, 2014, issued in connection with U.S. Appl. No. 13/341,237, filed Dec. 30, 2011, 12 pages".
"Non-Final Office Action mailed on Jan. 25, 2013, issued in connection with U.S. Appl. No. 13/341,237, filed Dec. 30, 2011, 9 pages".
"Non-Final Office Action mailed on Nov. 26, 2013, issued in connection with U.S. Appl. No. 13/341,237, filed Dec. 30, 2011, 15 pages".
""Sonos™ Digital Music System User Guide", Version: 070101, Sonos, Inc., Jan. 2007, 179 pages".
"Palm, Inc. "Handbook for the Palm VII Handheld" May 2000, 311 pages".
"Presentations at WinHEC 2000" May 2000, 138 pages.
PRISMIQ; Inc., "PRISMIQ Media Player User Guide", 2003, 44 pages.
"UPnP; "Universal Plug and Play Device Architecture"; Jun. 8, 2000; version 1.0; Microsoft Corporation; pp. 1-54".
""Welcome. You're watching Apple TV." Apple TV 3rd Generation Setup Guide, Mar. 16, 2012 Retrieved Oct. 16, 2014, 35 pages".
"Written Opinion of the International Searching Authority for Application No. PCT/US2014/039669, mailed on Sep. 22, 2014, 5 pages".
"Written Opinion of the International Searching Authority for PCT/US2014/034290 mailed Aug. 21, 2014".
"Written Opinion of the International Searching Authority for PCT/US2014/034292 mailed on Aug. 14, 2014".
"Written Opinion of the International Searching Authority for PCT/US2014/034372 mailed Aug. 20, 2014".
European Patent Office, "The Extended European Search Report", issued in connection with European patent application No. 12861517.6, Jun. 9, 2015, 11 pages.
"Advisory Action mailed on Sep. 17, 2015, issued in connection with U.S. Appl. No. 14/520,566, filed Oct. 22, 2014, 4 pages".
"Final Office Action mailed on Sep. 25, 2015, issued in connection with U.S. Appl. No. 13/904,949, filed May 29, 2013, 14 pages".
"Advisory Action mailed on Oct. 29, 2015, issued in connection with U.S. Appl. No. 13/864,081, filed Apr. 16, 2013, 3 pages."
"Final Office Action mailed on Oct. 23, 2015, issued in connection with U.S. Appl. No. 13/904,944, filed May 29, 2013, 13 pages".
International Bureau, International Preliminary Report on Patentability, mailed on Oct. 29, 2015, issued in connection with International Application No. PCT/US2014/034290, filed on Apr. 16, 2014, 7 pages.
International Bureau, International Preliminary Report on Patentibility, mailed on Oct. 29, 2015, issued in connection with International Application No. PCT/US2014/034292, filed on Apr. 16, 2014, 6 pages.
International Bureau, International Preliminary Report on Patentability, mailed on Oct. 29, 2015, issued in connection with International Application No. PCT/US2014/034372, filed on Apr. 16, 2014, 8 pages.
Notice of Allowance mailed Oct. 9, 2015, issued in connection with U.S. Appl. No. 13/864,086, filed Apr. 16, 2013, 14 pages.

(56) References Cited

OTHER PUBLICATIONS

Supplemental Notice of Allowability mailed on Nov. 4, 2015, issued in connection with U.S. Appl. No. 13/864,086, filed Apr. 16, 2013, 2 pages.
Japanese Office Action mailed on Oct. 20, 2015, issued in connection with Japanese Application No. 2014-550400, 8 pages.
Advisory Action mailed on Jun. 16, 2016, issued in connection with U.S. Appl. No. 13/904,896, filed May 29, 2013, 5 pages.
Advisory Action mailed on Apr. 29, 2016, issued in connection with U.S. Appl. No. 13/864,075, filed Apr. 16, 2013, 3 pages.
Anonymous, "Sonos Controller for Mac or PC Product Guide", Retrieved from the Internet, XP055254086, 2013, 108 pages.
European Patent Office, Exam Report mailed on Apr. 28, 2016, issued in connection with European Patent Application No. 12861517.6, 6 pages.
European Patent Office, Extended European Search Report mailed Jun. 7, 2016, issued in connection with European patent application No. 14803651.0, 10 pages.
Final Office Action mailed on Jun. 2, 2016, issued in connection with U.S. Appl. No. 14/520,566, filed Oct. 22, 2014, 12 pages.
Final Office Action mailed on May 19, 2016, issued in connection with U.S. Appl. No. 14/520,578, filed Oct. 22, 2014, 12 pages.
First Action Interview Office Action mailed on Jun. 20, 2016, issued in connection with U.S. Appl. No. 14/520,578, filed Oct. 22, 2014, 5 pages.
Non-Final Office Action mailed on Jun. 16, 2016, issued in connection with U.S. Appl. No. 13/904,932, filed May 29, 2013, 15 pages.
Notice of Allowance mailed on Jun. 6, 2016, issued in connection with U.S. Appl. No. 13/904,944, filed May 29, 2013, 5 pages.
Notice of Allowance mailed on Jun. 13, 2016, issued in connection with U.S. Appl. No. 13/864,075, filed Apr. 16, 2013, 11 pages.
Final Office Action mailed on Jan. 20, 2016, issued in connection with U.S. Appl. No. 14/628,952, filed Feb. 23, 2015, 10 pages.
Non-Final Office Action mailed on Feb. 2, 2016, issued in connection with U.S. Appl. No. 13/904,936, filed May 29, 2013, 14 pages.
Advisory Action mailed on Feb. 25, 2016, issued in connection with U.S. Appl. No. 13/904,944, filed May 29, 2013, 4 pages.
"Final Office Action mailed on Mar. 10, 2016, issued in connection with U.S. Appl. No. 13/904,932, filed May 29, 2013, 16 pages".
Notice of Allowance mailed on Feb. 26, 2016, issued in connection with U.S. Appl. No. 13/864,081, filed Apr. 16, 2013, 13 pages.
Final Office Action mailed on Mar. 21, 2016, issued in connection with U.S. Appl. No. 13/904,896, filed May 29, 2013, 19 pages.
Non-Final Office Action mailed on Mar. 17, 2016, issued in connection with U.S. Appl. No. 13/904,923, filed May 29, 2013, 15 pages.

Non-Final Office Action mailed on Mar. 25, 2016, issued in connection with U.S. Appl. No. 13/904,949, filed May 29, 2013, 13 pages.
Chen et al., "What a Juke! A Collaborative Music Sharing System," World of Wireless, Mobile and Multimedia Networks (WOWMOM), 2012 IEEE International Symposium, 2012, 6 pages.
Corrected Notice of Allowance mailed on Oct. 6, 2016, issued in connection with U.S. Appl. No. 13/904,949, filed May 29, 2013, 9 pages.
European Patent Office, Extended European Search Report mailed Aug. 1, 2016, issued in connection with European patent application No. 16160758.5, 11 pages.
European Patent Office, Extended European Search Report mailed Sep. 9, 2016, issued in connection with European patent application No. 14785247.9, 10 pages.
European Patent Office, Extended European Search Report mailed Oct. 18, 2016, issued in connection with European patent application No. 14785806.2, 9 pages.
Final Office Action mailed on Sep. 21, 2016, issued in connection with U.S. Appl. No. 13/904,923, filed May 29, 2013, 19 pages.
Final Office Action mailed on Aug. 29, 2016, issued in connection with U.S. Appl. No. 13/904,936, filed May 29, 2013, 21 pages.
International Searching Authority, International Report on Patentability mailed on Dec. 10, 2015, issued in connection with International Application No. PCT/US2014/039669, filed on May 28, 2014, 7 pages.
Japanese Patent Office, Japanese Office Action mailed on Jul. 21, 2016, issued in connection with Japanese Application No. 2014-550400, 10 pages.
Non-Final Office Action mailed on Aug. 12, 2016, issued in connection with U.S. Appl. No. 13/904,909, filed May 29, 2013, 21 pages.
Non-Final Office Action mailed on Jul. 25, 2016, issued in connection with U.S. Appl. No. 14/628,952, filed Feb. 23, 2015, 12 pages.
Notice of Allowance mailed on Nov. 7, 2016, issued in connection with U.S. Appl. No. 14/520,578, filed Oct. 22, 2014, 14 pages.
Notice of Allowance mailed on Sep. 20, 2016, issued in connection with U.S. Appl. No. 13/904,949, filed May 29, 2013, 12 pages.
Notice of Allowance mailed on Aug. 31, 2016, issued in connection with U.S. Appl. No. 14/520,566, filed Oct. 22, 2014, 7 pages.
Ritchie et al., "UPnP AV Architecture:2 For UPnP Version 1.0", 2010, XP055032201, retrieved from the internet: URL:http://upnp.org/specs/av/UPnP-av_AVArchitecture-v2.pdf, 11 pages.
Chinese Patent Office, Chinese Office Action mailed on Jan. 5, 2017, issued in connection with Chinese Application No. 201280069674.6, 14 pages.

* cited by examiner

SYSTEMS AND METHODS FOR NETWORKED MUSIC PLAYBACK

FIELD OF THE DISCLOSURE

The disclosure is related to consumer electronics and, more particularly, to providing music for playback via one or more devices on a playback data network.

BACKGROUND

Technological advancements have increased the accessibility of music content, as well as other types of media, such as television content, movies, and interactive content. For example, a user can access audio, video, or both audio and video content over the Internet through an online store, an Internet radio station, an online music service, an online movie service, and the like, in addition to the more traditional avenues of accessing audio and video content. Demand for such audio and video content continues to surge. Given the high demand, technology used to access and play such content has likewise improved.

BRIEF DESCRIPTION OF THE DRAWINGS

Features, aspects, and advantages of the presently disclosed technology are better understood with regard to the following description, appended claims, and accompanying drawings where:

Figure 1:
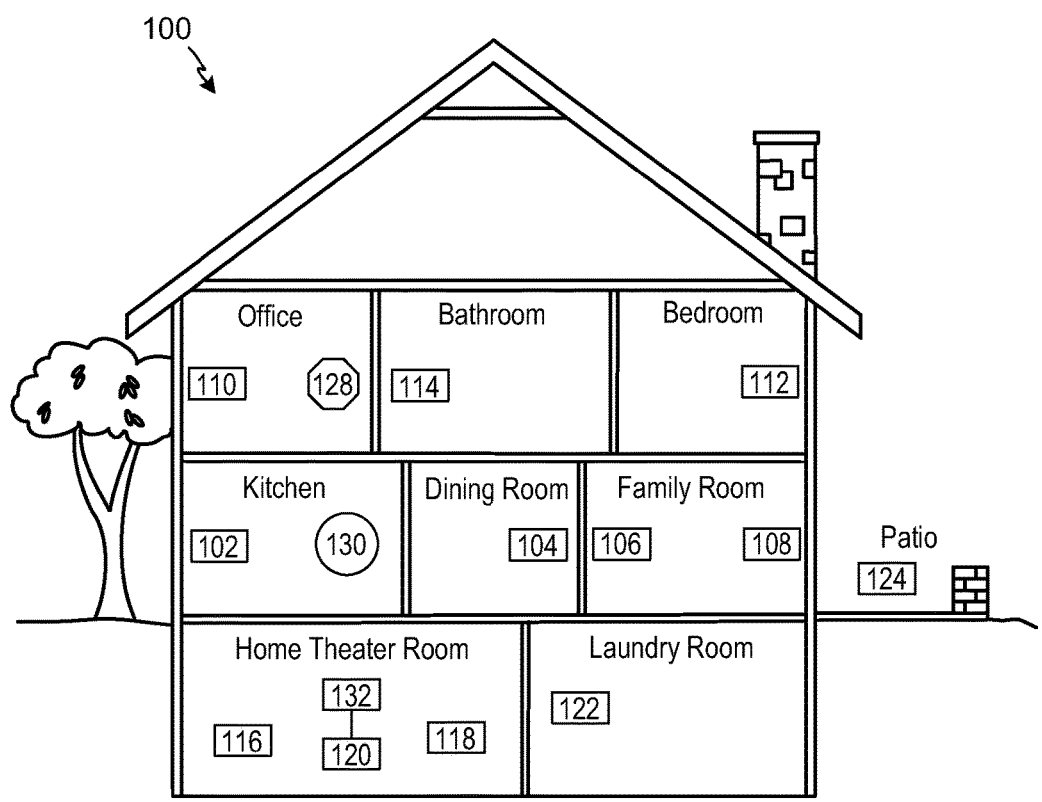
FIG. 1 shows an illustration of an example system in which embodiments of the methods and apparatus disclosed herein can be implemented.

In addition, the drawings are for the purpose of illustrating example embodiments, but it is understood that the present disclosure is not limited to the arrangements and instrumentality shown in the drawings.

DETAILED DESCRIPTION

I. Overview

Wired or wireless networks can be used to connect one or more multimedia playback devices for a home or other location playback network (e.g., a home music system). Certain examples provide automatic configuration of parameters of a playback device to be coupled to a network with reduced or minimum human intervention. For example, a wired and/or wireless ad-hoc network is established to facilitate communications among a group of devices. Music and/or other multimedia content can be shared among devices and/or groups of devices (also referred to herein as zones) associated with a playback network.

Certain embodiments facilitate streaming or otherwise providing music from a music-playing application (e.g., browser-based application, native music player, other multimedia application, and so on) to a multimedia content playback (e.g., Sonos™) system. Certain embodiments provide simple, easy-to-use and secure systems and methods for multimedia content playback across a plurality of systems and locations. Certain embodiments facilitate integration between content partners and a playback system as well as supporting maintenance of such content and system.

Although the following discloses example systems, methods, apparatus, and articles of manufacture including, among other components, firmware and/or software executed on hardware, it should be noted that such systems, methods, apparatus, and/or articles of manufacture are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

Reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

Certain embodiments provide a method to provide content to a local playback network. The example method includes identifying multimedia content from a content provider. The example method includes passing information regarding the multimedia content to a local playback system including one or more multimedia playback devices in response to a trigger. The example method includes facilitating play of the multimedia content via a local playback network associated with the local playback system.

Certain embodiments provide a computer readable storage medium including instructions for execution by a processor, the instructions, when executed, cause the processor to implement a method to provide content to a local playback network. The example method includes identifying multimedia content from a content provider. The example method includes passing information regarding the multimedia content to a local playback system including one or more multimedia playback devices in response to a trigger. The example method includes facilitating play of the multimedia content via a local playback network associated with the local playback system.

Certain embodiments provide a multimedia playback device including a wireless communication interface to communicate with a local playback network and a multimedia content source and a processor. The process is to identify multimedia content from the multimedia content source; pass information regarding the multimedia content to device on the local playback network in response to a trigger; and facilitate play of the multimedia content via the devices on the local playback network.

II. Example Environment

Referring now to the drawings, in which like numerals can refer to like parts throughout the figures, FIG. 1 shows an example system configuration 100 in which one or more of the method and/or apparatus disclosed herein can be practiced or implemented. By way of illustration, the system configuration 100 represents a home with multiple zones. Each zone, for example, represents a different room or space, such as an office, bathroom, bedroom, kitchen, dining room, family room, home theater room, utility or laundry room, and patio. While not shown here, a single zone can cover more than one room or space. One or more of zone players 102-124 are shown in each respective zone. A zone player 102-124, also referred to as a playback device, multimedia unit, speaker, and so on, provides audio, video, and/or audiovisual output. A controller 130 (e.g., shown in the kitchen for purposes of illustration) provides control to the system configuration 100. The system configuration 100 illustrates an example whole house audio system, though it is understood that the technology described herein is not limited to its particular place of application or to an expansive system like a whole house audio system 100 of FIG. 1.

Figure 2A:
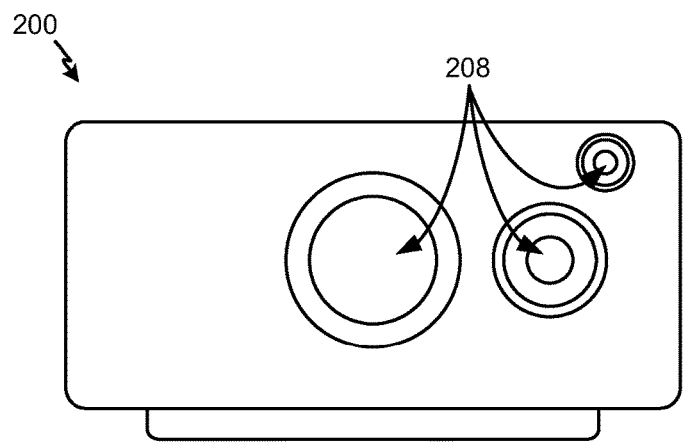
FIG. 2A shows an illustration of an example zone player having a built-in amplifier and speakers.
Figure 2B:
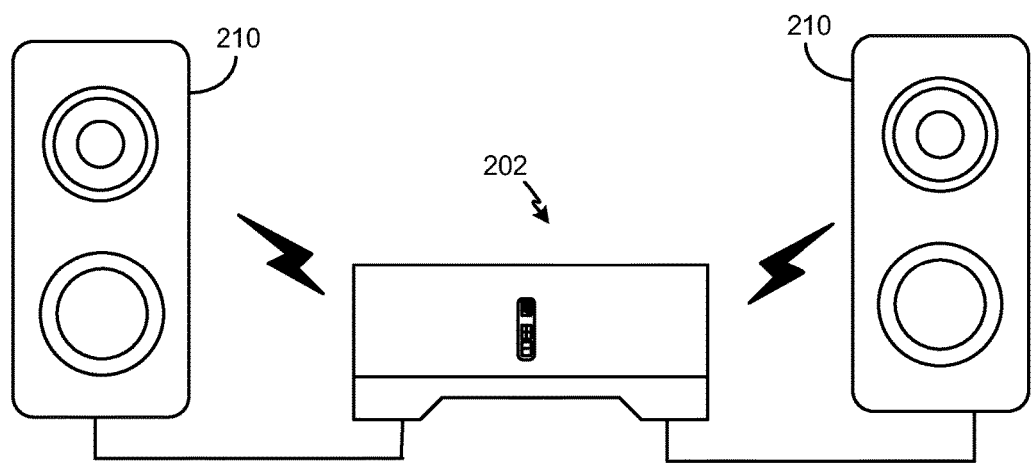
FIG. 2B shows an illustration of an example zone player having a built-in amplifier and connected to external speakers.
Figure 2C:
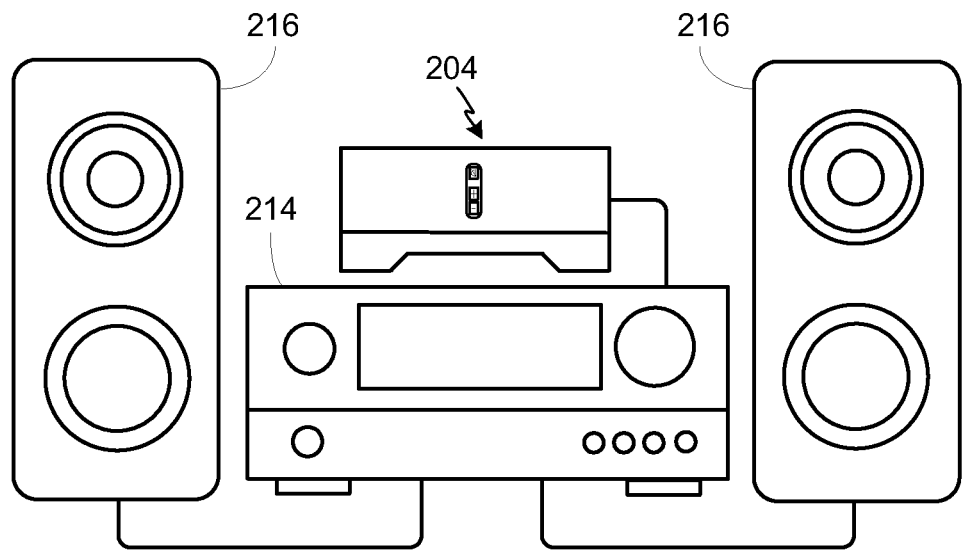
FIG. 2C shows an illustration of an example zone player connected to an A/V receiver and speakers.

FIGS. 2A, 2B, and 2C show example illustrations of zone players 200-204. The zone players 200-204 of FIGS. 2A, 2B, and 2C, respectively, can correspond to any of the zone players 102-124 of FIG. 1. While certain embodiments provide multiple zone players, an audio output can be generated using only a single zone player. FIG. 2A illustrates a zone player 200 including sound producing equipment 208 capable of generating sound or an audio output corresponding to a signal received (e.g., wirelessly and/or via a wired interface). The sound producing equipment 208 of the zone player 200 of FIG. 2A includes a built-in amplifier (not shown in this illustration) and speakers (e.g., a tweeter, a mid-range driver, and/or a subwoofer). In certain embodiments, the zone player 200 of FIG. 2A can be configured to play stereophonic audio or monaural audio. In some embodiments, the zone player 200 of FIG. 2A can be configured as a component in a combination of zone players to play stereophonic audio, monaural audio, and/or surround audio. As described in greater detail below, in some embodiments, the example zone player 200 of FIG. 2A can also transmit a second signal to, for example, other zone player(s) in the same or different zone(s), speaker(s), receiver(s), and so on. Transmission of the second signal can be part of, for example, a system in which multiple zone players, speakers, receivers, and so on, form a network to, for example, present media content in a synchronization or distributed manner.

The example zone player 202 of FIG. 2B includes a built-in amplifier (not shown in this illustration) to power a set of detached speakers 210. The speakers 210 of FIG. 2B can include, for example, any type of loudspeaker. The zone player 202 of FIG. 2B can communicate a signal corresponding to audio content to the detached speakers 210 via wired and/or wireless channels. Instead of receiving and generating audio content as in FIG. 2A, the zone player 202 of FIG. 2B receives the audio content and transmits the same (e.g., after processing the received signal) to the detached speakers 210. Similar to the example zone player 200 of FIG. 2A, in some embodiments the zone player 202 can transmit a second signal to, for example, other zone player(s) in the same or different zone(s), speaker(s), receiver(s), and so on.

The example zone player 204 of FIG. 2C does not include an amplifier, but allows a receiver 214, or another audio and/or video type device with built-in amplification, to connect to a data network 128 of FIG. 1 and to play audio received over the data network 128 via the receiver 214 and a set of detached speakers 216. In addition to the wired couplings shown in FIG. 2C, the detached speakers 216 can receive audio content via a wireless communication channel between the detached speakers 216 and, for example, the zone player 204 and/or the receiver 214. In some embodiments the zone player 202 can transmit a second signal to, for example, other zone player(s) in the same or different zone(s), speaker(s), receiver(s), and so on.

Example zone players include a "Sonos® S5," "Sonos Play:5," "Sonos Play:3," "ZonePlayer 120," and "ZonePlayer 90," which are offered by Sonos, Inc. of Santa Barbara, Calif. Any other past, present, and/or future zone players can additionally or alternatively be used to implement the zone players of example embodiments disclosed herein. A zone player can also be referred to herein as a playback device, and a zone player is not limited to the particular examples illustrated in FIGS. 2A, 2B, and 2C. For example, a zone player can include a wired or wireless headphone. In other examples, a zone player might include a subwoofer. In yet other examples, a zone player can include a sound bar. In an example, a zone player can include or interact with a docking station for an Apple iPod™ or similar device. In some embodiments, a zone player can relay one or more signals received from, for example, a first zone player to another playback device. In some embodiments, a zone player can receive a first signal and generate an output corresponding to the first signal and, simultaneously or separately, can receive a second signal and transmit or relay the second signal to another zone player(s), speaker(s), receiver(s), and so on. Thus, an example zone player described herein can act as a playback device and, at the same time, operate as a hub in a network of zone players. In such instances, media content corresponding to the first signal can be different from the media content corresponding to the second signal.

Figure 3:
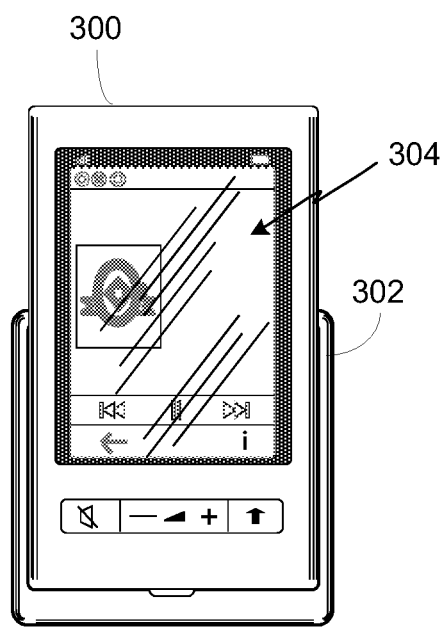
FIG. 3 shows an illustration of an example controller.

FIG. 3 shows an example illustration of a wireless controller 300 in a docking station 302. The controller 300 can correspond to the controlling device 130 of FIG. 1. The controller 300 is provided with a touch screen 304 that allows a user to interact with the controller 300, for example, to retrieve and navigate a playlist of audio items, control operations of one or more zone players, and provide overall control of the system configuration 100. In certain embodiments, any number of controllers can be used to control the system configuration 100. In certain embodiments, there can be a limit on the number of controllers that can control the system configuration 100. The controllers might be wireless like wireless controller 300 or wired to the data network 128. Furthermore, an application running on any network-enabled portable devices, such as an iPhone™, iPad™, Android™ powered phone, or any other smart phone or network-enabled device can be used as a controller by connecting to the data network 128. An application running on a laptop or desktop PC or Mac can also be used as a controller. Example controllers include a "Sonos® Controller 200," "Sons® Controller for iPhone," "Sonos® Controller for iPad," "Sonos® Controller for Android, "Sonos® Controller for Mac or PC," which are offered by Sonos, Inc. of Santa Barbara, Calif. The flexibility of such an application and its ability to be ported to a new type of portable device is advantageous.

Referring back to the system configuration 100 of FIG. 1, a particular zone can contain one or more zone players. For example, the family room of FIG. 1 contains two zone players 106 and 108, while the kitchen is shown with one zone player 102. Zones can be dynamically configured by positioning a zone player in a room or space and assigning via the controller 130 the zone player to a new or existing zone. As such, zones can be created, combined with another zone, removed, and given a specific name (e.g., "Kitchen"), if so programmed. The zone players 102 to 124 are coupled directly or indirectly to a data network, such as the data network 128 shown in FIG. 1. The data network 128 is represented by an octagon in the figure to stand out from other components shown in the figure. While the data network 128 is shown in a single location, it is understood that such a network can be distributed in and around the system configuration 100.

Particularly, the data network 128 can be a wired network, a wireless network, or a combination of both. In some embodiments, one or more of the zone players 102-124 are wirelessly coupled to the data network 128 based on a proprietary mesh network. In some embodiments, one or more of the zone players 102-124 are wirelessly coupled to the data network 128 using a non-mesh topology. In some embodiments, one or more of the zone players 102-124 are coupled via a wire to the data network 128 using Ethernet or similar technology. In addition to the one or more zone players 102-124 connecting to the data network 128, the data network 128 can further allow access to a wide area network, such as the Internet.

In certain embodiments, the data network 128 can be created by connecting any of the zone players 102-124, or some other connecting device, to a broadband router. Other zone players 102-124 can then be added wired or wirelessly to the data network 128. For example, a zone player (e.g., any of zone players 102-124) can be added to the system configuration 100 by simply pressing a button on the zone player itself, which enables a connection to be made to the data network 128. The broadband router can be connected to an Internet Service Provider (ISP), for example. The broadband router can be used to form another data network within the system configuration 100, which can be used in other applications (e.g., web surfing). The data network 128 can also be used in other applications, if so programmed. Further, in certain embodiments, the data network 128 is the same network used for other applications in the household.

In certain embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly listening to the audio. Further, zones can be put into a "party mode" such that all associated zones will play audio in synchrony.

In certain embodiments, a zone contains two or more zone players. For example, the family room contains two zone players 106 and 108, and the home theater room contains at least zone players 116, 118, and 120. A zone can be configured to contain as many zone players as desired, and for example, the home theater room might contain additional zone players to play audio from a 5.1 channel or greater audio source (e.g., a movie encoded with 5.1 or greater audio channels). If a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players can play audio in synchrony with other zone players.

In certain embodiments, three or more zone players can be configured to play various channels of audio that is encoded with three channels or more sound. For example, the home theater room shows zone players 116, 118, and 120. If the sound is encoded as 2.1 channel audio, then the zone player 116 can be configured to play left channel audio, the zone player 118 can be configured to play right channel audio, and the zone player 120 can be configured to play bass frequencies. Other configurations are possible and depend on the number of zone players and the type of audio. Further, a particular zone can be configured to play a 5.1 channel audio in one instance, such as when playing audio from a movie, and then dynamically switch to play stereo, such as when playing audio from a two channel source.

In certain embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device is preferably set in a consolidated mode.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

Sources of audio content to be played by zone players 102-124 are numerous. Music from a personal library stored on a computer or networked-attached storage (NAS) can be accessed via the data network 128 and played. Internet radio stations, shows, and podcasts can be accessed via the data network 128. Music services that let a user stream and download music and audio content can be accessed via the data network 128. Further, music can be obtained from traditional sources, such as a turntable or CD player, via a line-in connection to a zone player, for example. Audio content can also be accessed through AirPlay™ wireless technology by Apple, Inc., for example. Audio content received from one or more sources can be shared amongst the zone players 102 to 124 via the data network 128 and/or the controller 130. The above-disclosed sources of audio content are referred to herein as network-based audio information sources. However, network-based audio information sources are not limited thereto.

The example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Example Playback Device

Figure 4:
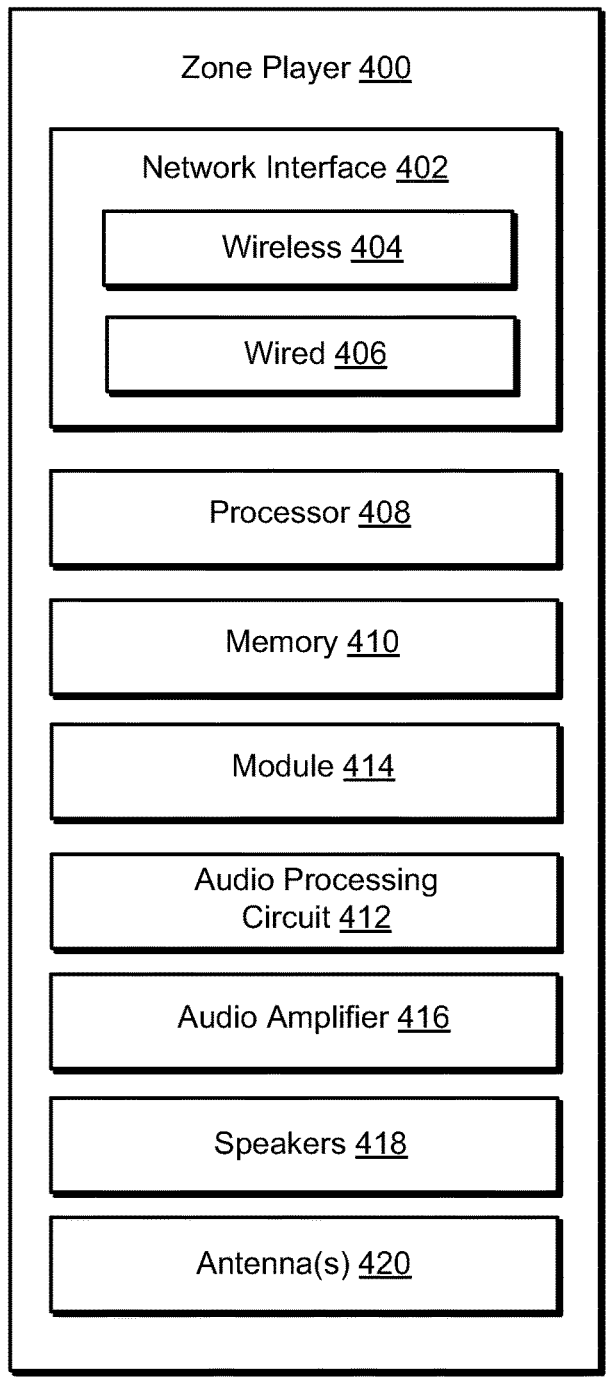
FIG. 4 shows an internal functional block diagram of an example zone player.

Referring now to FIG. 4, there is shown an example functional block diagram of a zone player 400 in accordance with an embodiment. The zone player 400 of FIG. 4 includes a network interface 402, a processor 408, a memory 410, an audio processing component 412, a module 414, an audio amplifier 416, and a speaker unit 418 coupled to the audio amplifier 416. FIG. 2A shows an example illustration of such a zone player. Other types of zone players can not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a lamp for indoor or outdoor use.

Referring back to FIG. 4, the network interface 402 facilitates a data flow between zone players and other devices on a data network (e.g., the data network 128 of FIG. 1) and the zone player 400. In some embodiments, the network interface 402 can manage the assembling of an audio source or file into smaller packets that are to be transmitted over the data network or reassembles received packets into the original source or file. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, the network interface 402 can include one or both of a wireless interface 404 and a wired interface 406. The wireless interface 404, also referred to as an RF interface, provides network interface functions for the zone player 400 to wirelessly communicate with other devices (e.g., other zone player(s), speaker(s), receiver(s), component(s) associated with the data network 128, and so on) in accordance with a communication protocol (e.g., any of the wireless standards IEEE 802.11a, 802.11b, 802.11g, 802.11n, or 802.15). To receive wireless signals and to provide the wireless signals to the wireless interface 404 and to transmit wireless signals, the zone player 400 of FIG. 4 includes one or more antennas 420. The wired interface 406 provides network interface functions for the zone player 400 to communicate over a wire with other devices in accordance with a communication protocol (e.g., IEEE 802.3). In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software modules 414, which can be executed by the processor 408 to achieve certain tasks. In the illustrated embodiment, the memory 410 is a tangible machine readable medium storing instructions that can be executed by the processor 408. In some embodiments, a task might be for the zone player 400 to retrieve audio data from another zone player or a device on a network. In some embodiments, a task might be for the zone player 400 to send audio data to another zone player or device on a network. In some embodiments, a task might be for the zone player 400 to synchronize playback of audio with one or more additional zone players. In some embodiments, a task might be to pair the zone player 400 with one or more zone players to create a multi-channel audio environment. Additional or alternative tasks can be achieved via the one or more software modules 414 and the processor 408.

The audio processing component 412 can include one or more digital-to-analog converters (DAC), an audio preprocessing component, an audio enhancement component or a digital signal processor, and so on. In certain embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include necessary circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (for low frequencies), a mid-range driver (middle frequencies), and a tweeter (high frequencies), for example. An enclosure can be sealed or ported, for example.

A zone player 400 can also be referred to herein as a playback device. An example playback device includes a Sonos® Play:5, which is manufactured by Sonos, Inc. of Santa Barbara, Calif. The Play:5 is an example zone player with a built-in amplifier and speakers. In particular, the Play:5 is a five-driver speaker system that includes two tweeters, two mid-range drivers, and one subwoofer. When playing audio content via the Play:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies, just from different channels of audio. Audio from Internet radio stations, online music and video services, downloaded music, analog audio inputs, television, DVD, and so on, can be played from a Sonos® Play:5. While the Play:5 is an example of a zone player with speakers, it is understood that a zone player with speakers is not limited to one with a certain number of speakers (e.g., five speakers as in the Play:5), but rather can contain one or more speakers. Further, a zone player can be part of another device, which might even serve a purpose different than audio (e.g., a lamp).

IV. Example Controller

Figure 5:
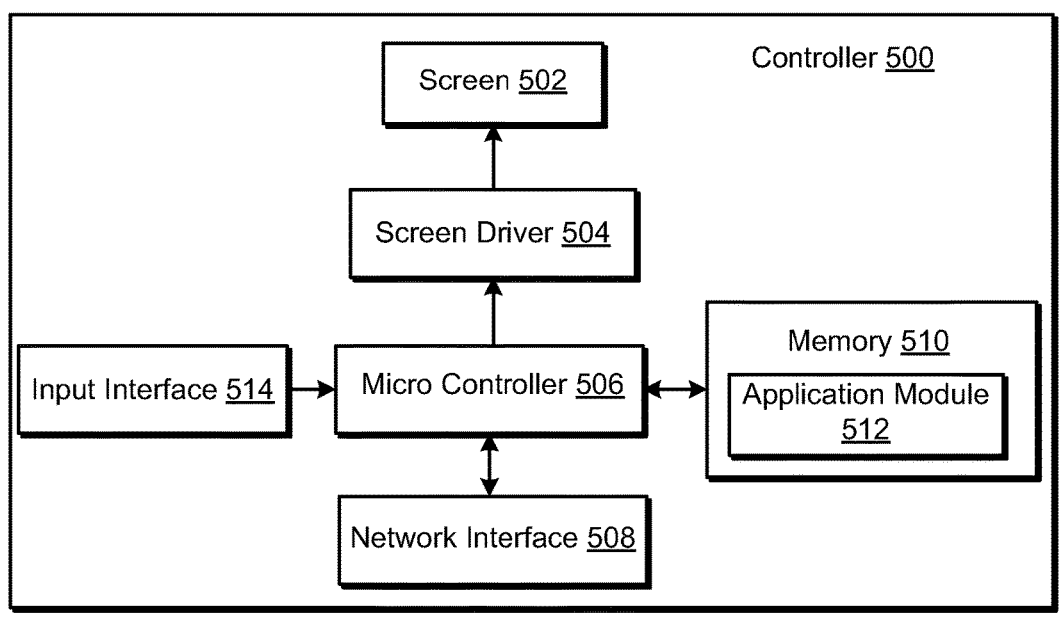
FIG. 5 shows an internal functional block diagram of an example controller.

Referring now to FIG. 5, there is shown an example controller 500, which can correspond to the controlling device 130 in FIG. 1. The controller 500 can be used to facilitate the control of multi-media applications, automation and others in a system. In particular, the controller 500 is configured to facilitate a selection of a plurality of audio sources available on the network and enable control of one or more zone players (e.g., the zone players 102-124 in FIG. 1) through a wireless network interface 508. According to one embodiment, the wireless communications is based on an industry standard (e.g., infrared, radio, wireless standards IEEE 802.11a, 802.11b 802.11g, 802.11n, or 802.15). Further, when a particular audio is being accessed via the controller 500 or being played via a zone player, a picture (e.g., album art) or any other data, associated with the audio source can be transmitted from a zone player or other electronic device to the controller 500 for display.

The controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system. Further, a controller can be integrated into a zone player.

It should be noted that other network-enabled devices such as an iPhone®, iPad® or any other smart phone or network-enabled device (e.g., a networked computer such as a PC or Mac®) can also be used as a controller to interact or control zone players in a particular environment. In some embodiments, a software application or upgrade can be downloaded onto a network enabled device to perform the functions described herein.

In certain embodiments, a user can create a zone group including at least two zone players from the controller 500. The zone players in the zone group can play audio in a synchronized fashion, such that all of the zone players in the zone group play back an identical audio source or a list of identical audio sources in a synchronized manner such that no (or substantially no) audible delays or hiccups could be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would need to manually and individually link each zone. The single command might include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Example Ad-Hoc Network

Figure 6:
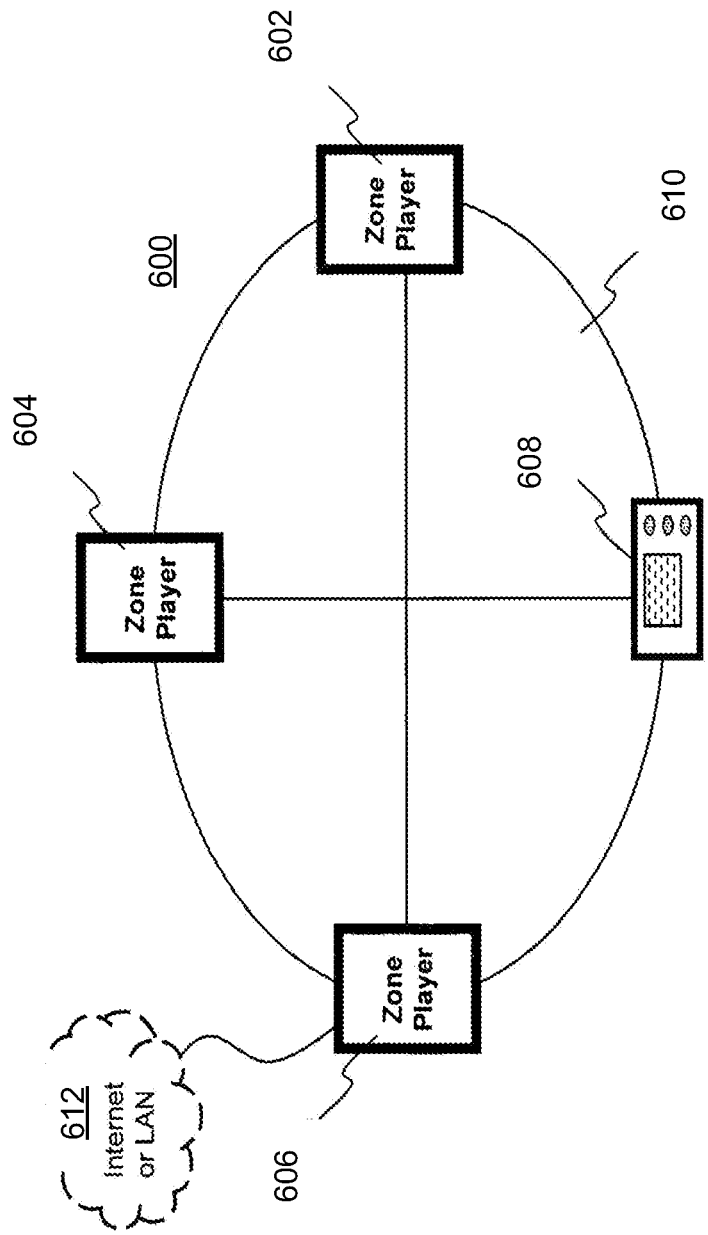
FIG. 6 shows an example ad-hoc playback network.

Certain particular examples will now be provided in connection with FIGS. 6-8B to describe, for purposes of illustration only, certain base systems and methods to provide and facilitate connection to a playback network. FIG. 6 shows that there are three zone players 602, 604 and 606 and a controller 608 that form a network branch that is also referred to as an Ad-Hoc network 610. The network 610 may be wireless, wired, or a combination of wired and wireless. In general, an Ad-Hoc (or "spontaneous") network is a local area network or other small network in which there is no one access point for all traffic. With an established Ad-Hoc network 610, the devices 602, 604, 606 and 608 can all communicate with each other in a "peer-to-peer" style of communication, for example. Furthermore, devices may come/and go from the network 610, and the network 610 will automatically reconfigure itself without needing the user to reconfigure the network 610.

Using the Ad-Hoc network 610, the devices 602, 604, 606, and 608 can share or exchange one or more audio sources and be grouped to play the same or different audio sources. For example, the devices 602 and 604 are grouped to playback one piece of music, and at the same time, the device 606 plays back another piece of music. In other words, the devices 602, 604, 606 and 608, as shown in FIG. 6, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 10 (or household identifier).

In certain embodiments, a household identifier (HHID) is a short string or an identifier that is computer-generated to help ensure that it is unique. Accordingly, the network 610 can be characterized by a unique HHID and a unique set of configuration variables or parameters, such as channels (e.g., respective frequency bands), SSID (a sequence of alphanumeric characters as a name of a wireless network), and WEP keys (wired equivalent privacy or other security keys). In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., WEP keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 308 or a computing device, for example.

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously. In an environment that has both networks in use, it is assumed that at least one device in a system is connected to both as a bridging device, thus providing bridging services between wired/wireless networks for others. The zone player 606 in FIG. 6 is shown to be connected to both networks, for example. The connectivity to the network 612 is based on Ethernet while the connectivity to other devices 602, 604 and 608 is based on Wireless. It is understood, however, that in some embodiments each zone player 606, 604, 602 may access the Internet when retrieving media from the cloud (e.g., Internet) via the bridging device. For example, zone player 602 may contain a uniform resource locator (URL) that specifies an address to a particular audio track in the cloud. Using the URL, the zone player 602 may retrieve the audio track from the cloud, and ultimately play the audio out of one or more zone players.

VI. Example Music Sharing and Playback Configuration

Certain embodiments enable a user to stream music from a music-playing application (e.g., browser-based application, native music player, other multimedia application, and so on) to a local multimedia content playback (e.g., Sonos™) system. Certain embodiments provide secure systems and methods for multimedia content playback across a plurality of systems and locations. Certain embodiments facilitate integration between content partners and a playback system as well as supporting maintenance of such content and system.

Figure 7:
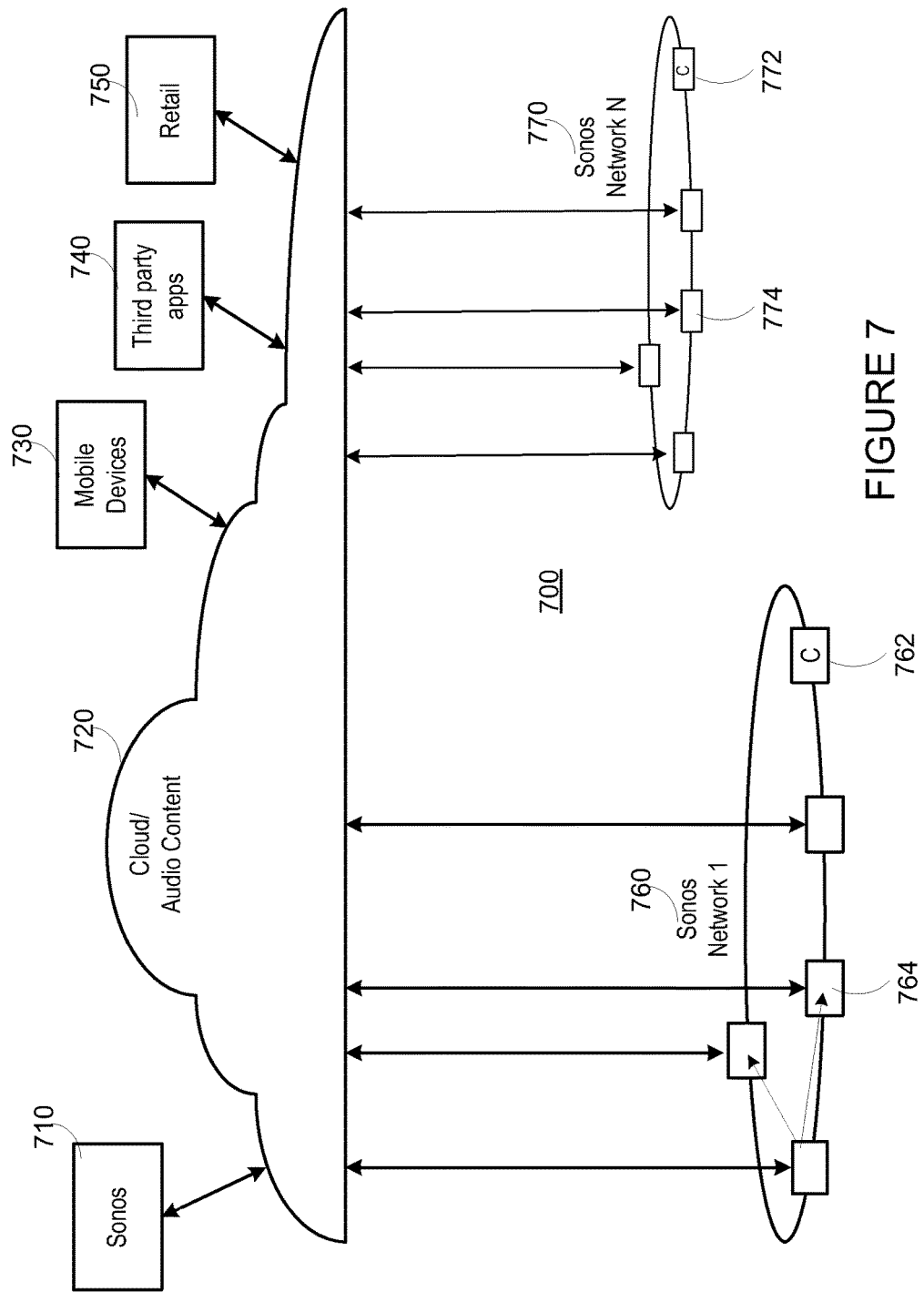
FIG. 7 shows a system including a plurality of networks including a cloud-based network and at least one local playback network.

FIG. 7 shows a system including a plurality of networks including a cloud-based network and at least one local playback network. The network includes a plurality of playback devices or players, though it is understood that the network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 700 of FIG. 7, a plurality of content providers 720-750 can be connected to one or more local playback networks 760-770 via a cloud and/or other network 710. Using the cloud 710, a multimedia playback system 720 (e.g., Sonos™), a mobile device 730, a third party application 740, a retail location 750, and so on can provide multimedia content (requested or otherwise) to local playback networks 760, 770. Within each local network 760, 770, a controller 762, 772 and/or playback device 764, 774 can provide a song identifier, song name, playlist identifier, playlist name, genre, preference, and so on, and/or simply receive content from a connected system via the cloud.

For example, a user listens to a third party music application (e.g., Pandora™, Rhapsody™, Spotify™, and so on) on her smart phone while commuting. She's enjoying the current channel and, as she walks in the door to her home, selects an option to continue playing that channel on her household music playback system (e.g., Sonos™). The playback system picks up from the same spot on the selected channel that was on her phone and outputs that content (e.g., that song) on speakers and/or other playback devices connected to the household playback system. A uniform resource indicator (URI) (e.g., a uniform resource locator (URL)) can be passed to a playback device to fetch content from a cloud and/or other networked source, for example. A playback device, such as a zone player, can fetch content on its own without use of a controller, for example. Once the zone player has a URL (or some other identification or address) for a song and/or playlist, the zone player can run on its own to fetch the content. Songs and/or other multimedia content can be retrieved from the Internet rather than a local device (e.g., a compact disc (CD)), for example. A third party application can open or utilize an application programming interface (API) to pass music to the household playback system without tight coupling to that household playback system.

In another example of an application determining a playlist and/or other content for playback, a user enjoys listening to music on an online music service (e.g., turntable.fm or other virtual room that a user can enter to choose from a plurality of online disc jockeys (DJs) deciding what to play next) using his Mac Book Pro™ at home. He likes the unique user experience the service offers, and he frequently hops from room to room discovering new music. To maximize sound quality, he plays the music on his household playback system (e.g., Sonos™). A button or other indicator can be added to the turntable.fm Web application to switch the content being played to the playback system for output (e.g., to the Sonos™ system rather than or in addition to the Mac Book™). While Web-based applications typically do not have access to items on a local network, certain embodiments enable a third-party Web-based application (e.g., Turntable.fm) to talk to a playback system (e.g., Sonos™) in a certain way (e.g., may have to log in with a username and password), and the identified user has the website send audio or audio and video down to a playback device (e.g., a zone player) on the playback system local network to play music there (or some other media).

In another example, a first user creates a playlist (e.g., a Spotify™ playlist). The first user visits a second user's house, pulls out her smart phone and shares her playlist by playing it on the second user's household playback (e.g., Sonos™) system using her third party (e.g., Spotify™) application. The first user may also go to the third party content provider's (e.g., Spotify'S™) website and share her playlist on the second user's playback system.

Thus, certain embodiments provide cross-service linking such that a song identifier can be passed from one user and/or service to another to be fetched and played. A user having a playlist on his or her phone can visit a friend and, using her account on her friend's system, play a song to which she has an access right. A retrieved song can streamed locally to a user's phone, or an application can pass a song identifier to a local playback system which looks up the song identifier and finds an available audio stream to which the user has a right to play and then plays that song.

In another example, a user is staying in a hotel room or other facility including a local playback network. For example, a speaker and/or other playback device (e.g., a Sonos™ Play:3, Play: 5 and so on) in a hotel room can be utilized to play multimedia content to which the user has access from his or her playback network account, streaming audio source, third party application, and so on. Content can be output to one or more devices based on availability, access, configuration, priority, preference, and so on. In certain embodiments, a playback network includes a plurality of nodes, and each node has a capability to play sound in response to an input. Requested output is provided to a most logical connection, for example.

In certain embodiments, a phone device, a television device, and so on can be used to play music, audio, video and/or other multimedia content. In an example, a push button on a microphone or household intercom system to tell the kids dinner is ready is provided over the local playback network.

Figure 8:
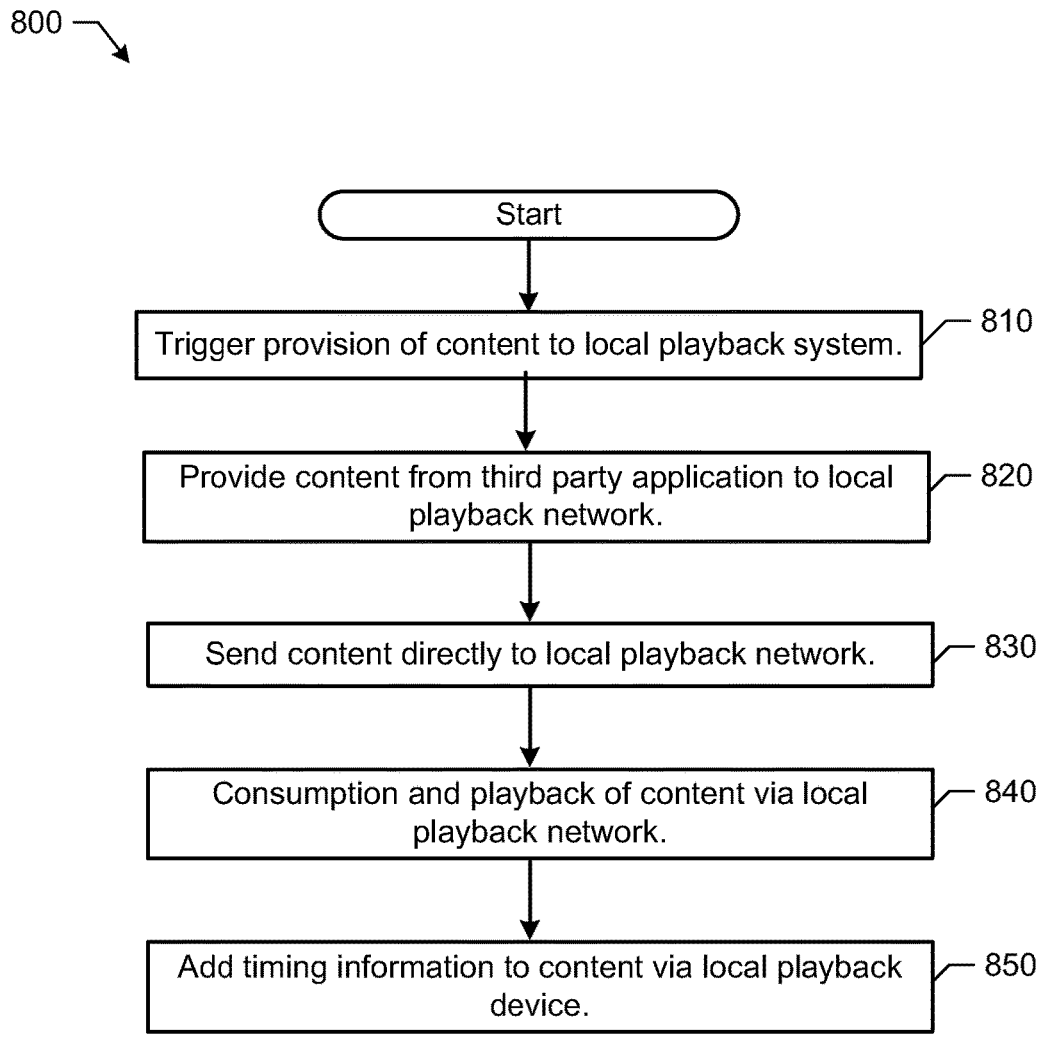
FIGS. 8-11 show flow diagrams for methods to provide audio content to a local playback system.

FIG. 8 shows a flow diagram for a method 800 to provide audio content to a local playback system. In the example method 800 of FIG. 8, a third party application acts as a "virtual line-in" to the local playback system. At block 810, streaming of music or other content from a third party application to a local content playback system is triggered. For example, a "Play to Sonos" button is pressed on a Rhapsody™ application. At block 820, content is streamed to one or more components in a household playback network. The music may be streamed to predetermined zones or players in a household, for example. The music may be further directed to be played in different zones or players throughout the household. Playback on the local network can be facilitated to one or more zones/players based on a configuration (e.g., a zone scene, theme, and so on). Thus, certain embodiments allow a large degree of flexibility in where the music is actually played. For example, the music can be played in the kitchen, the family room, the patio, and so on. Further, the music may be redirected to different zones.

At block 830, the incoming content (e.g., audio) stream is provided directly from a third party application or other external source to the local playback network for playback. For example, rather than passing track identifiers, an audio stream is provided to a Sonos household system for playback to one or more configured zones. At block 840, the local playback system consumes the stream and plays it as it would other content on the local playback (e.g., Sonos™) network (e.g., via zones and so on). At block 850, a playback device (e.g., a zone player, Play:3™, Play:5™, and so on) adds timing information to the streaming content signal (e.g., the device takes the streaming audio signal and repackages it for local synchronized playback). In some embodiments, timing information is not added to the signal unless two or more playback devices are configured to play the audio in synchrony.

Figure 9:
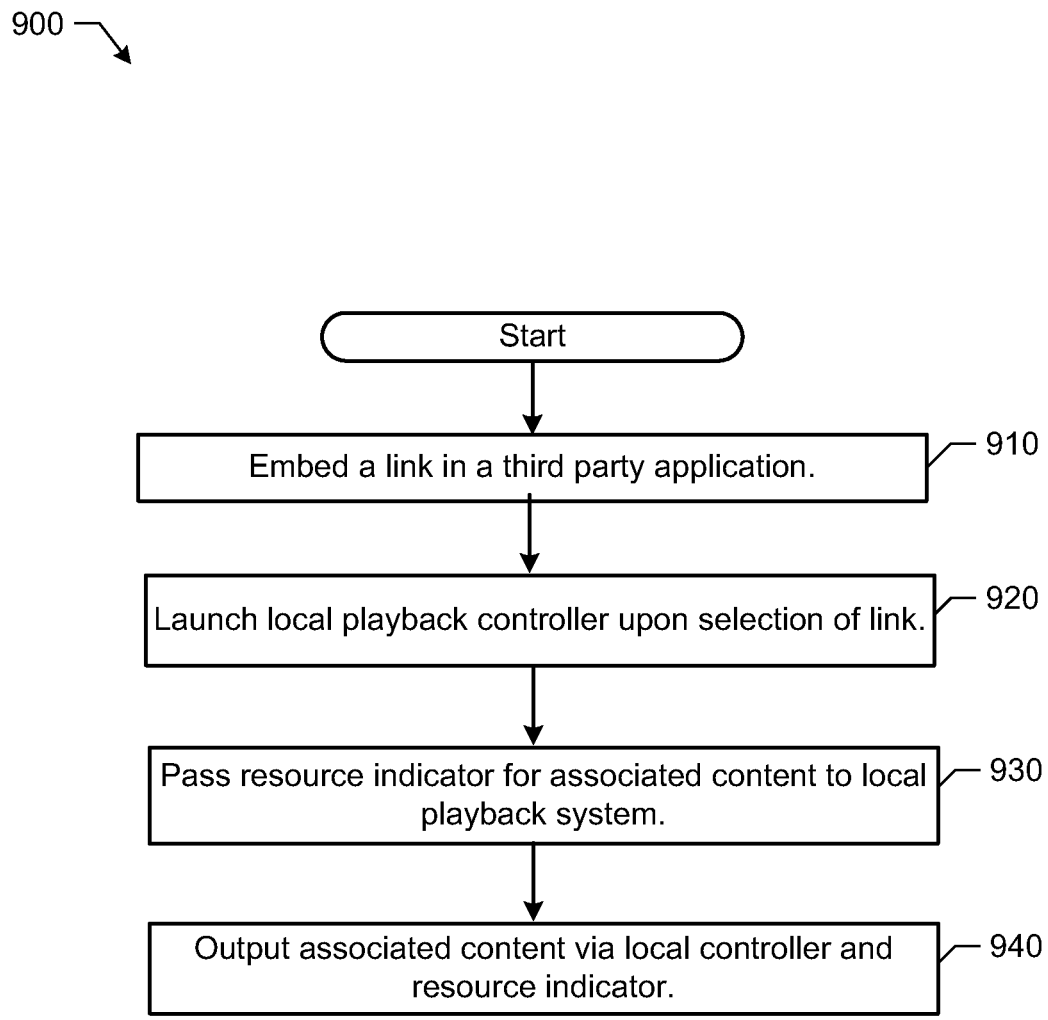

FIG. 9 shows a flow diagram for a method 900 to provide audio content to a local playback system. In the example method 900 of FIG. 9, a uniform resource indicator (URI) handler approach is provided for content output. At block 910, a link or other reference is embedded in a third party application (e.g., Facebook™ or Twitter). At block 920, when the link is selected (e.g., clicked), a local playback (e.g., Sonos™) controller, if available, is launched. At block 930, the application (e.g., accessed on a phone, tablet, computer, and so on) passes a URI for associated content (e.g., an audio track and so on) to a local playback system (e.g., Sonos™) controller. At block 940, the local controller outputs the associated content (e.g., plays the music) via the URI. For example, music is streamed from the cloud to one or more playback devices on the local playback network.

In certain embodiments, an application associated with the operating system can register to handle all URIs (URLs) that start with a certain prefix and can define how data is encoded into those URLs so a local playback system application can generate a link (e.g., "sonos:") and put that link into a message (e.g., email, text message, instant message (IM), etc.). The local playback application registered to handle such URLs can parse the URLs to determine what song, playlist, streaming radio station, etc., to play. This launches the controller application. For example, if a first listener likes a song and tweets that song, Twitter™ can include a clickable link which launches a playback application and starts the music playing on a local playback system if the local system can find the song (e.g., if have the application, if have rights/access to the song, etc.). In certain embodiments, the system knows to trigger the receiving user's system rather than the sending user's system to play associated content based on the transmitted link/identifier.

For example, an application can register with the system to handle all URLs that start with a custom prefix (e.g., an HTTP "scheme"). For instance, Sonos controller apps can register to handle any URL that begins with "sonos:" or "x-sonos:". In certain embodiments, a playback system provider can define and publish the format of its URLs so that any third party application can create a link or reference to content. A large amount of data can be encoded into a URL using query parameters, for example.

In an example, when an application tries to "open" or "browse" to a URL, the system checks to see if the scheme of the URL matches the "sonos:" scheme that has been registered with the application. If a URL handler application is found, the system launches that application (e.g., the application can but does not need to be running in the background) and passes the URL to the application. The application then parses the URL and executes functionality based on the data in the URL. For example, the URL can contain the name of a music service and a playlist identifier from that service, plus the name of a Sonos™ Zone Player, causing the Sonos controller to start that playlist playing on that zone.

Figure 10:
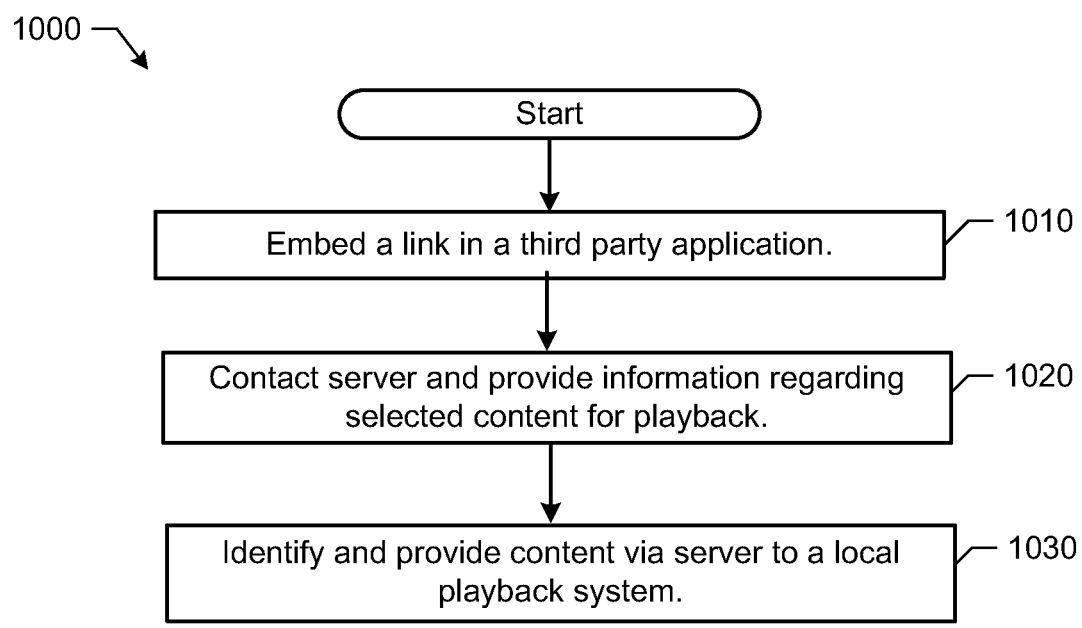

FIG. 10 shows a flow diagram for a method 1000 to provide audio content to a local playback system. In the example method 1000 of FIG. 10, at block 1010, a link or other reference is embedded in a third party application (e.g., Facebook™). At block 1020, when the link is selected, a playback system (e.g., Sonos™) server is contacted and provided with information regarding selected content for playback. For example, rather than launching a local controller application, a server is contacted regarding music for playback on a local network. At block 1030, using the provided information, the server identifies and provides the content locally on a user's local playback system. For example, the server can then start playing the music directly on the user's Sonos™ system (e.g., without going through a Sonos™ controller application).

In certain embodiments, a "single sign-on" technology is provided so that the user does not need to re-enter a username and password in order to authenticate to the playback server. Example single sign-on technologies include Facebook Connect™, Windows Live ID™, etc.

In certain embodiments, instead of using a specialized link, such as a "sonos:" link, a normal URL can be used to point to a playback system (e.g., Sonos™) webserver, which generates links with special data embedded in the link. A playback system is identified, and content identified by the URL can be playing at via the local playback network (e.g., mesh network configured for home, hotel room, etc.). Parameters such as authentication, security, location, and so on can be configured for local playback of remote content.

Figure 11:
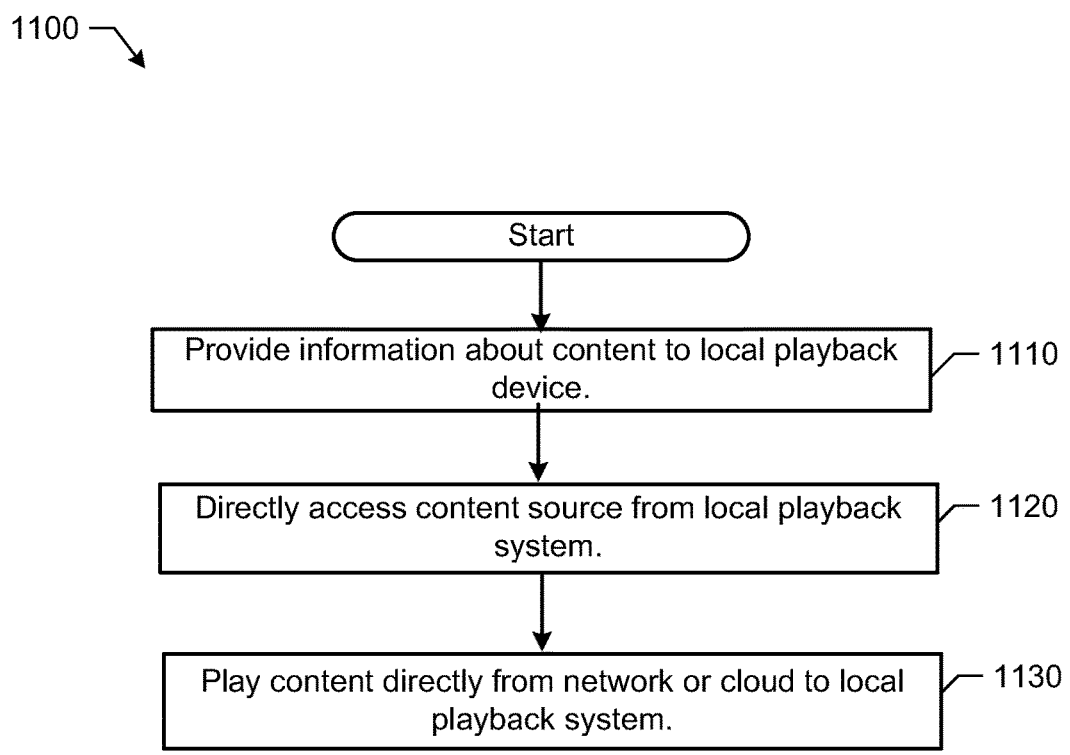

FIG. 11 shows a flow diagram for a method 1100 to provide audio content to a local playback system. The example method 1100 of FIG. 11 provides a "throw it over the wall" approach to content delivery to a local playback system. At block 1110, a third party application provides a multimedia playback device (e.g., a Sonos™ zone player (ZP)) with enough information about content (e.g., an audio track) so that, at block 1120, the local playback system (e.g., SonosNet™) can directly access a source of the content and, at block 1130, play the content directly off the network (e.g., the Internet) or cloud.

In certain embodiments, a local playback controller application is not involved. Information passed over to the local playback device may include an identifier for a single track, a playlist, a streaming radio station, a programmed radio station, and so on. This information can also include a current play position within a list to enable near-seamless "handoff" of music from a portable device to a local playback system. Once the music information is handed from the third-party application to the local playback system, there is no further synchronization between the two systems.

A connection between the third-party application and the local playback device (e.g., Sonos ZonePlayer™) can be direct over a local area network (LAN), remote through a proxy server in the cloud, and so on. A LAN delivery approach may be easier to integrate into "native" applications (e.g., applications written for iOS or Android), and a proxy server approach may be easier for third party applications that are browser-based, for example.

In certain embodiments, information is provided from a third party application to a local playback system without being routed through or by a controller application. Here, the third party application is communicating with the multimedia playback device (e.g., a Sonos ZonePlayer™). Information can be passed locally, rather than through the Internet, for example. The local playback device accesses the Internet to find content to stream, and the third party application takes the place of the controller application (e.g., throw it over the wall—the application passes information and the local playback system runs it).

Certain embodiments provide an approach similar to the "throw it over the wall" or one way communication approach of FIG. 11 except that the third party application not only tells the local playback system what to play, but also maintains two-way communication with the local playback (e.g., Sonos™) system. Two-way communication helps enable features such as keeping a local playback queue synchronized with a queue that the user is editing/managing in the third party application; allow the third party application to know what is currently playing on the local playback system; allow integrated transport control between the third party application and the local playback system; and so on.

In certain embodiments, a local playback system can pass information back to a third party application to indicate a current point of playback (e.g., now playing a third song in a playlist, fourth song in the playlist, and so on). The local playback system can pass parameter information, such as a change in volume, from a local multimedia playback device to the third party application so the application can reflect the change in volume to the user via its graphical user interface. The third party application can instruct the local playback system to skip a song, go to a certain location, and so on.

Certain embodiments provide a third party mode that allows users to select from any local playback network (e.g., Sonos™) controller to listen to audio from one or more third party applications on their smartphones or tablets (e.g., Android™ devices). For example, a user may be using a local playback network controller application and now wants a third party application to appear as an audio source within the controller application. The user can then select the controller application that he or she wishes to play audio from the third party application, for example.

Certain embodiments provide queue management to allow a third party application to control a local playback queue. That is, the local playback system has a queue, but the third party application allows users to add, delete and so on from the queue, for example. Rather than switch from content that the user is currently playing, the local playback system allows a user to create a playlist on the fly. For example, if last.fm users vote that they do not like a song and it should be skipped, then the local playback system will skip it.

Certain embodiments allow a third party application to override a local playback queue with its own application-specific queue. The local playback system periodically fetches a short list of tracks to play next. The list of tracks to play is determined by the third-party application, for example. In certain embodiments, a shared queue is provided between the local playback system and the third party application to keep the local system and application synchronized.

Certain embodiments allow control of playback system functions and/or settings via an external (e.g., third party) application. For example, a local playback system can allow volume control, play/pause, and so on and can interact with an application running on a given platform/operating system (OS). Certain embodiments provide a Web API that can be used to access functionality.

Certain embodiments facilitate control of a local playback system from outside a household or other location at which the local playback network is configured. For example, a user can queue up music while away from his or her house. The application can facilitate setup and/or configuration. For example, a third party application may ask the user to enter a Sonos customer email address and password. The application can then make a request to a Sonos server in the cloud to determine the zone groups on which music can be played.

Various inventions have been described in sufficient detail with a certain degree of particularity. It is understood to those skilled in the art that the present disclosure of embodiments has been made by way of examples only and that numerous changes in the arrangement and combination of parts can be resorted without departing from the spirit and scope of the present disclosure as claimed. While the embodiments discussed herein can appear to include some limitations as to the presentation of the information units, in terms of the format and arrangement, the embodiments have applicability well beyond such embodiment, which can be appreciated by those skilled in the art. Accordingly, the scope of the present disclosure is defined by the appended claims rather than the forgoing description of embodiments.

We claim:

1. A method comprising:
   causing, via a controller, a graphical interface to display a control interface including one or more transport controls to control playback by the controller;
   after connecting to a local area network via a network interface, identifying a particular zone group of at least two playback devices connected to the local area network;
   causing, via the controller, the graphical interface to display a selectable option for transferring playback from the controller;
   detecting, via the controller, a set of inputs to transfer playback from the controller to a particular zone group of at least two playback devices, wherein the set of inputs comprises: (i) a selection of the selectable option for transferring playback from the controller and (ii) a selection of the particular zone group connected to the local area network;
   after detecting the set of inputs to transfer playback from the controller to the particular zone group, causing playback to be transferred from the controller to the particular zone group, wherein transferring playback from the controller to the particular zone group comprises:
      (a) causing one or more first cloud servers to add multimedia content to a local playback queue of the particular zone group;
      (b) causing playback at the controller to be stopped; and
      (c) modifying the one or more transport controls of the control interface to control playback by the particular zone group; and
   causing the particular zone group to play back the multimedia content, wherein the particular zone group playing back the multimedia content comprises at least one of the playback devices in the particular zone group retrieving the multimedia content from one or more second cloud servers of a streaming content service and playing back the retrieved multimedia content in synchrony with at least one other of the at least two playback devices in the particular zone group.

2. The method of claim 1, wherein the particular zone group comprises a given zone that includes a first playback device as a first channel of a stereo pair and a second playback device as a second channel of the stereo pair, and wherein the particular zone group playing back the retrieved multimedia content comprises the first playback device and the second playback device playing back the multimedia content as the stereo pair.

3. The method of claim 1, further comprising detecting a set of inputs to transfer playback from the particular zone group back to the controller, wherein transferring playback from the particular zone group to the controller comprises:
   causing playback by the particular zone group to be stopped; and
   initiating playback at the controller.

4. The method of claim 1, wherein causing the graphical interface to display the control interface including one or more transport controls to control playback by the controller comprises causing the graphical interface to display the one or more transport control in a particular arrangement, and wherein modifying the one or more transport controls of the controller to control playback by the particular zone group comprises modifying the one or more transport controls to control playback by the particular zone group while the one or more transport controls are in the particular arrangement.

5. The method of claim 1, wherein causing the one or more first cloud servers to add multimedia content to the local playback queue of the particular zone group comprises causing an identifier of the multimedia content to be added to the local playback queue, wherein the identifier indicates a particular source of the multimedia content at the one or more second cloud servers, wherein one or more playback devices of the particular zone group receives the multimedia content from the particular source at the one or more second cloud servers of the streaming content service.

6. The method of claim 1, wherein causing one or more first cloud servers to add the multimedia content to the local playback queue of the particular zone group comprises sending a message to the streaming content service that causes the one or more first cloud servers to add the multimedia content to the local playback queue of the particular zone group.

7. The method of claim 1, wherein causing playback at the controller to be stopped comprises causing playback of the multimedia content at the controller to be stopped.

8. The method of claim 1, wherein the controller comprises an application running on a control device.

9. The method of claim 8, wherein the control device and the playback device are communicatively coupled via the local area network, and wherein the one or more first cloud servers of the streaming content service are outside of the local area network.

10. The method of claim 1, wherein the multimedia content comprises a plurality of audio tracks from the streaming content service.

11. The method of claim 1, wherein the controller is of the streaming content service.

12. The method of claim 1, wherein causing the particular zone group to play back the multimedia content comprises sending, via a local area network to at least one playback device of the particular zone group, one or more messages that cause the particular zone group to retrieve the multimedia content from the streaming content service.

13. The method of claim 1, wherein detecting the set of inputs further comprises detecting a trigger, wherein detecting the trigger comprises detecting one or more third inputs that are different from the selection of the selectable option for transferring playback from the controller and the selection of the particular zone group connected to the local area network.

14. The method of claim 13, wherein detecting the one or more third inputs comprises detecting selection of a button on the control interface.

15. The method of claim 13, wherein detecting the one or more third inputs comprises detecting an input that causes playback at the controller to be stopped.

16. A tangible, non-transitory computer readable storage medium including instructions for execution by a processor, the instructions, when executed, cause the processor to implement a method comprising:
 causing, via a controller, a graphical interface to display a control interface including one or more transport controls to control playback by the controller;
 after connecting to a local area network via a network interface, identifying a particular zone group of at least two playback devices connected to the local area network;
 causing, via the controller, the graphical interface to display a selectable option for transferring playback from the controller;
 detecting, via the controller, a set of inputs to transfer playback from the controller to a particular zone group of at least two playback devices, wherein the set of inputs comprises: (i) a selection of the selectable option for transferring playback from the controller and (ii) a selection of the particular zone group connected to the local area network;
 after detecting the set of inputs to transfer playback from the controller to the particular zone group, causing playback to be transferred from the controller to the particular zone group, wherein transferring playback from the controller to the particular zone group comprises:
  (a) causing one or more first cloud servers to add multimedia content to a local playback queue of the particular zone group;
  (b) causing playback at the controller to be stopped; and
  (c) modifying the one or more transport controls of the control interface to control playback by the particular zone group; and
 causing the particular zone group to play back the multimedia content, wherein the particular zone group playing back the multimedia content comprises at least one of the playback devices in the particular zone group retrieving the multimedia content from one or more second cloud servers of a streaming content service and playing back the retrieved multimedia content in synchrony with at least one other of the at least two playback devices in the particular zone group.

17. The tangible, non-transitory computer readable storage medium of claim 16, wherein the particular zone group comprises a given zone that includes a first playback device as a first channel of a stereo pair and a second playback device as a second channel of the stereo pair, and wherein the particular zone group playing back the retrieved multimedia content comprises the first playback device and the second playback device playing back the multimedia content as the stereo pair.

18. The tangible, non-transitory computer readable storage medium of claim 16, further comprising detecting a set of inputs to transfer playback from the particular zone group back to the controller, wherein transferring playback from the particular zone group to the controller comprises:
 causing playback by the particular zone group to be stopped; and
 initiating playback at the controller.

19. The tangible, non-transitory computer readable storage medium of claim 16, wherein causing the graphical interface to display the control interface including one or more transport controls to control playback by the controller comprises causing the graphical interface to display the one or more transport control in a particular arrangement, and wherein modifying the one or more transport controls of the controller to control playback by the particular zone group comprises modifying the one or more transport controls to control playback by the particular zone group while the one or more transport controls are in the particular arrangement.

20. The tangible, non-transitory computer readable storage medium of claim 16, wherein causing the one or more first cloud servers to add multimedia content to the local playback queue of the particular zone group comprises causing an identifier of the multimedia content to be added to the local playback queue, wherein the identifier indicates a particular source of the multimedia content at the one or more second cloud servers, wherein one or more playback devices of the particular zone group receives the multimedia content from the particular source at the one or more second cloud servers of the streaming content service.

21. The tangible, non-transitory computer readable storage medium of claim 16, wherein causing one or more first cloud servers to add the multimedia content to the local playback queue of the particular zone group comprises sending a message to the streaming content service that causes the one or more first cloud servers to add the multimedia content to the local playback queue of the particular zone group.

22. The tangible, non-transitory computer readable storage medium of claim 16, wherein causing playback at the controller to be stopped comprises causing playback of the multimedia content at the controller to be stopped.

23. The tangible, non-transitory computer readable medium of claim 16, wherein the controller comprises an application running on a control device.

24. The tangible, non-transitory computer readable storage medium of claim 16, wherein causing the particular zone group to play back the multimedia content comprises sending, via a local area network to at least one playback device of the particular zone group, one or more messages that cause the particular zone group to retrieve the multimedia content from the streaming content service.

25. The tangible, non-transitory computer readable storage medium of claim 16, wherein causing one or more first cloud servers to add the multimedia content to the local playback queue of the particular zone group comprises sending a message to the streaming content service that causes the one or more first cloud servers to add the multimedia content to the local playback queue of the particular zone group.

26. The tangible, non-transitory computer readable storage medium of claim 16, wherein causing playback at the controller to be stopped comprises causing playback of the multimedia content at the controller to be stopped.

27. The tangible, non-transitory computer readable storage medium of claim 16, wherein detecting the set of inputs further comprises detecting a trigger, wherein detecting the trigger comprises detecting one or more third inputs that are different from the selection of the selectable option for transferring playback from the controller and the selection of the particular zone group connected to the local area network.

28. The tangible, non-transitory computer readable storage medium of claim 27, wherein detecting the one or more third inputs comprises detecting selection of a button on the control interface.

29. The tangible, non-transitory computer readable storage medium of claim 27, wherein detecting the one or more third inputs comprises detecting an input that causes playback at the controller to be stopped.

30. A control device comprising:
a graphical interface;
a wireless communication interface;
one or more processors;
computer-readable media having instructions encoded therein, wherein the instructions, when executed by the one or more processors, cause a controller to perform functions comprising:
causing the graphical interface to display a control interface including one or more transport controls to control playback by the control device;
after connecting to a local area network via a network interface, identifying a particular zone group of at least two playback devices connected to the local area network;
causing the graphical interface to display a selectable option for transferring playback from the control device;
detecting a set of inputs to transfer playback from the control device to a particular zone group of at least two playback devices, wherein the set of inputs comprises: (i) a selection of the selectable option for transferring playback from the control device and (ii) a selection of the particular zone group connected to the local area network;
after detecting the set of inputs to transfer playback from the control device to the particular zone group of at least two playback devices, causing playback to be transferred from the control device to the particular zone group, wherein transferring playback from the control device to the particular zone group comprises:
(a) causing one or more first cloud servers to add multimedia content to a local playback queue of the particular zone group;
(b) causing playback at the control device to be stopped; and
(c) modifying the one or more transport controls of the control interface to control playback by the particular zone group; and
causing the particular zone group to play back the multimedia content, wherein the particular zone group playing back the multimedia content comprises at least one of the playback devices in the particular zone group retrieving the multimedia content from one or more second cloud servers of a streaming content service and playing back the retrieved multimedia content in synchrony with at least one other of the at least two playback devices in the particular zone group.

31. The control device of claim 30, wherein the controller comprises an application running on the control device.

32. The control device of claim 30, wherein causing the particular zone group to play back the multimedia content comprises sending, via a local area network to at least one playback device of the particular zone group, one or more messages that cause the particular zone group to retrieve the multimedia content from the streaming content service.

33. The control device of claim 30, wherein causing one or more first cloud servers to add the multimedia content to the local playback queue of the particular zone group comprises sending a message to the streaming content service that causes the one or more first cloud servers to add the multimedia content to the local playback queue of the particular zone group.

34. The control device of claim 30, wherein causing playback at the controller to be stopped comprises causing playback of the multimedia content at the controller to be stopped.

35. The control device of claim 30, wherein detecting the set of inputs further comprises detecting a trigger, wherein detecting the trigger comprises detecting one or more third inputs that are different from the selection of the selectable option for transferring playback from the controller and the selection of the particular zone group connected to the local area network.

36. The control device of claim 35, wherein detecting the one or more third inputs comprises detecting selection of a button on the control interface.

37. The control device of claim 35, wherein detecting the one or more third inputs comprises detecting an input that causes playback at the controller to be stopped.

* * * * *